(12) United States Patent
Ignatowski et al.

(10) Patent No.: US 11,784,576 B2
(45) Date of Patent: Oct. 10, 2023

(54) HIGH FREQUENCY POWER SUPPLY SYSTEM WITH CLOSELY REGULATED OUTPUT FOR HEATING A WORKPIECE

(71) Applicant: THERMATOOL CORP., East Haven, CT (US)

(72) Inventors: Thomas G. Ignatowski, Orange, CT (US); Michael A. Nallen, Hampden, MA (US); Lesley D. Frame, New Haven, CT (US)

(73) Assignee: Thermatool Corp., East Haven, CT (US)

( * ) Notice: Subject to any disclaimer, the term of this patent is extended or adjusted under 35 U.S.C. 154(b) by 545 days.

(21) Appl. No.: 17/104,257

(22) Filed: Nov. 25, 2020

(65) Prior Publication Data

US 2021/0099098 A1   Apr. 1, 2021

Related U.S. Application Data

(62) Division of application No. 15/388,573, filed on Dec. 22, 2016, now Pat. No. 10,855,194.

(Continued)

(51) Int. Cl.
| | |
|---|---|
| *H02M 5/458* | (2006.01) |
| *B23K 11/087* | (2006.01) |
| *B23K 11/24* | (2006.01) |
| *B23K 13/02* | (2006.01) |
| *B23K 13/08* | (2006.01) |
| *H01F 29/10* | (2006.01) |

(Continued)

(52) U.S. Cl.
CPC ......... *H02M 5/458* (2013.01); *B23K 11/0873* (2013.01); *B23K 11/241* (2013.01); *B23K 13/025* (2013.01); *B23K 13/08* (2013.01); *H01F 29/10* (2013.01); *H02M 7/5387* (2013.01); *B23K 2101/04* (2018.08); *H02M 7/4818* (2021.05); *Y02B 70/10* (2013.01)

(58) Field of Classification Search
CPC .. B23K 11/0873; B23K 13/025; B23K 13/08; B23K 11/241; B23K 2101/04; H02M 5/458; H02M 7/5387; H02M 7/4818; H01F 29/10; Y02B 70/10
USPC .......................................... 219/661
See application file for complete search history.

(56) References Cited

U.S. PATENT DOCUMENTS

| | | | | |
|---|---|---|---|---|
| 3,074,030 A | * | 1/1963 | Hierholzer, Jr. ........ | H02M 1/08 363/136 |
| 3,657,579 A | * | 4/1972 | Kramer ............. | H02M 7/53803 310/318 |

(Continued)

*Primary Examiner* — Eric S Stapleton
(74) *Attorney, Agent, or Firm* — Philip O. Post

(57) ABSTRACT

A method of controlling highly regulated power and frequency from a high frequency power supply system to provide a highly regulated power and frequency to a workpiece load where the highly regulated power and frequency can be independent of the workpiece load characteristics by inverter switching control and an inverter output impedance adjusting and frequency control network that can include precision variable reactor pairs with a geometrically-shaped moveable insert core section and a stationary split-bus section with a complementary geometrically-shaped split bus section and a split electric terminal bus section where the insert core section can be moved relative to the stationary split-bus section to vary the inductance of the variable reactors.

10 Claims, 22 Drawing Sheets

Related U.S. Application Data

(60) Provisional application No. 62/270,880, filed on Dec. 22, 2015.

(51) Int. Cl.
  *H02M 7/5387* (2007.01)
  *H02M 7/48* (2007.01)
  *H01J 19/16* (2006.01)
  *B23K 101/04* (2006.01)

(56) References Cited

U.S. PATENT DOCUMENTS

| | | | | |
|---|---|---|---|---|
| 4,346,332 A * | 8/1982 | Walden | ............ | H05B 41/2828 315/307 |
| 4,641,232 A * | 2/1987 | Pitel | ............ | H02M 7/4807 363/71 |
| 4,685,041 A * | 8/1987 | Bowman | ............ | H02M 3/28 363/40 |
| 4,814,962 A * | 3/1989 | Magalhaes | ............ | H02M 3/3376 363/16 |
| 5,902,506 A * | 5/1999 | Scott | ............ | H05B 6/08 219/661 |
| 5,954,985 A * | 9/1999 | Scott | ............ | H05B 6/08 219/666 |
| 6,459,213 B1 * | 10/2002 | Nilssen | ............ | H02M 7/53832 315/DIG. 4 |
| 9,899,877 B2 * | 2/2018 | Mitcheson | ............ | G01R 31/66 |
| 2013/0051105 A1 * | 2/2013 | Wang | ............ | H02M 1/42 363/132 |
| 2014/0246364 A1 * | 9/2014 | Hruska | ............ | C02F 1/78 204/554 |
| 2014/0266144 A1 * | 9/2014 | Khan | ............ | H02M 7/538 323/355 |
| 2015/0381057 A1 * | 12/2015 | Luu | ............ | H02M 3/33571 363/21.01 |
| 2017/0179841 A1 * | 6/2017 | Ignatowski | ............ | B23K 11/241 |
| 2017/0181227 A1 * | 6/2017 | Ignatowski | ............ | H05B 6/104 |

* cited by examiner

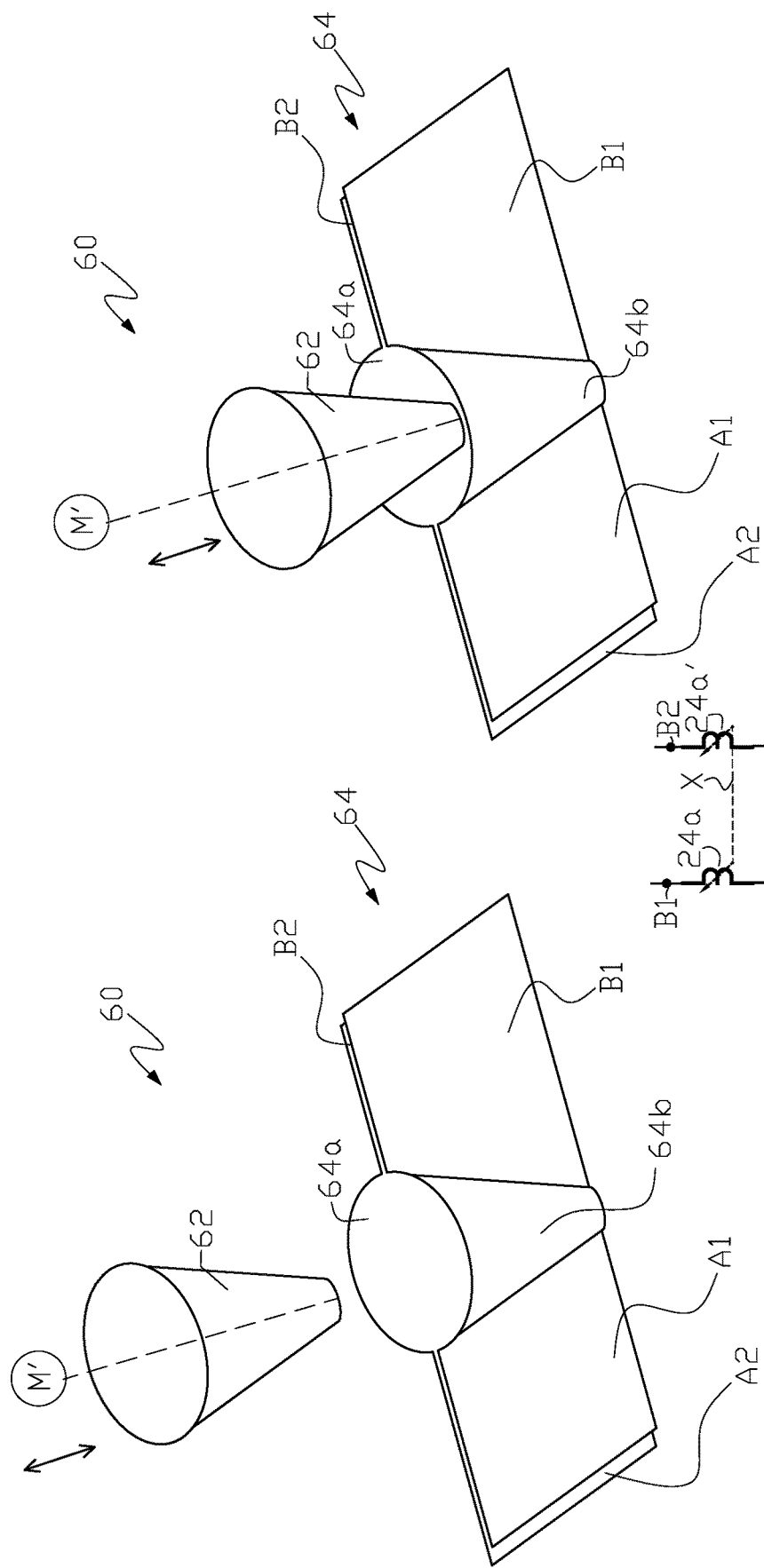

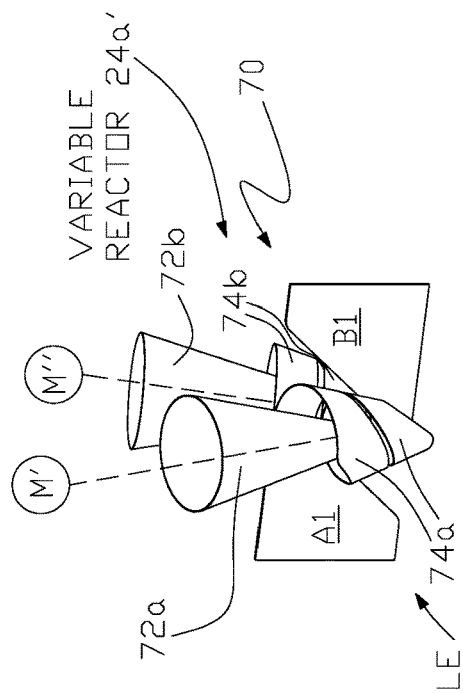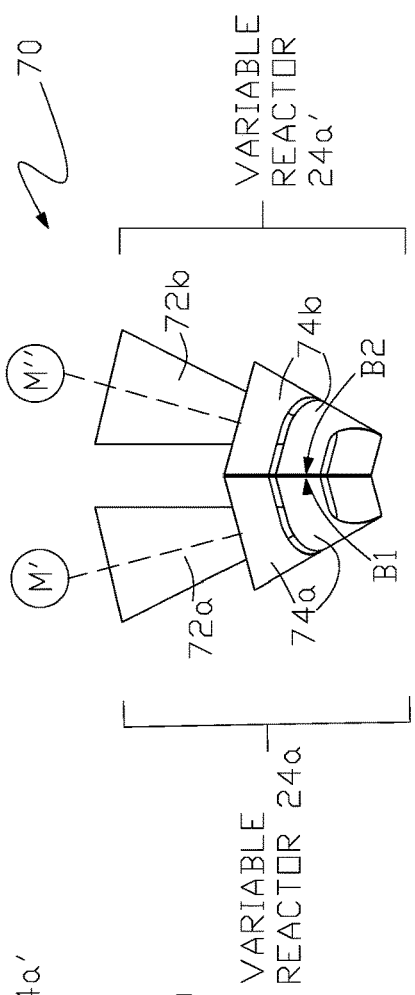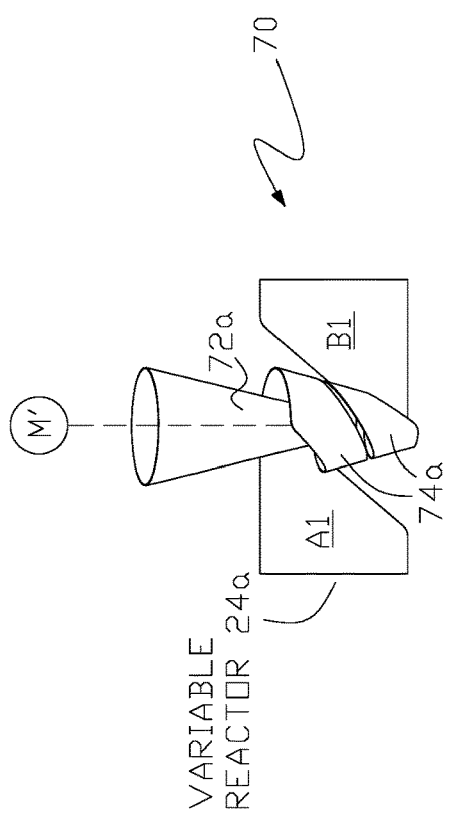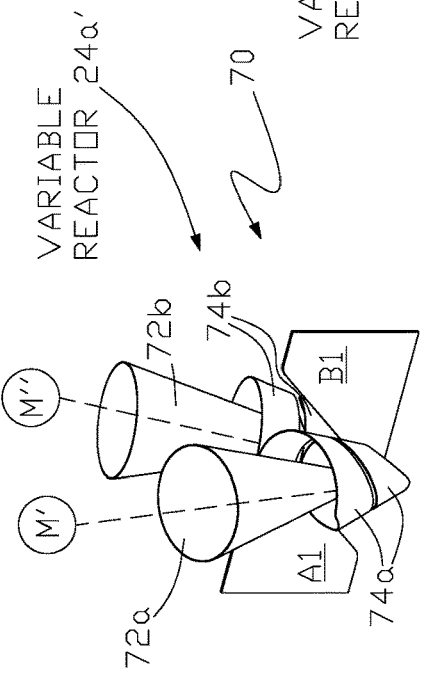

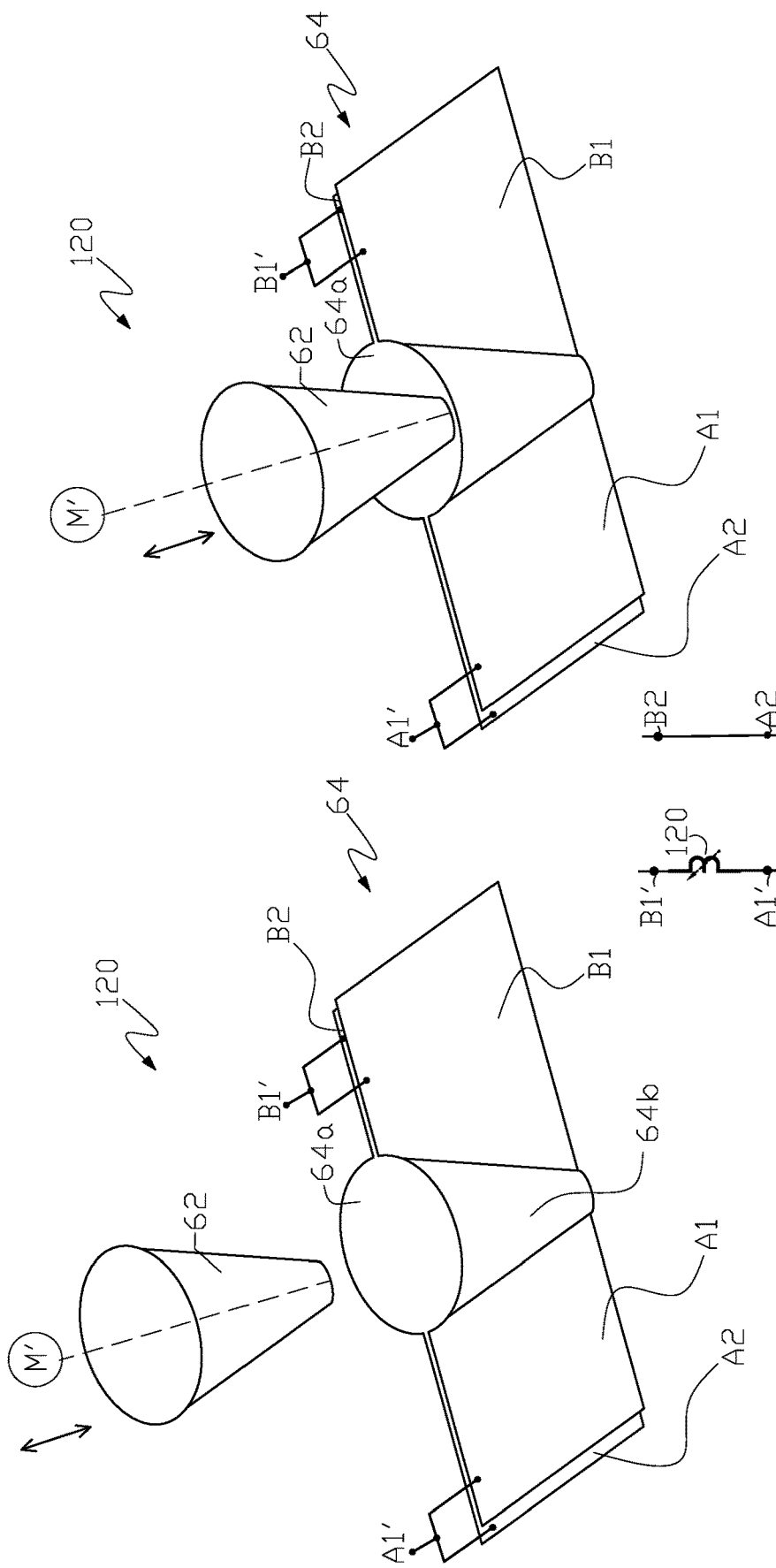

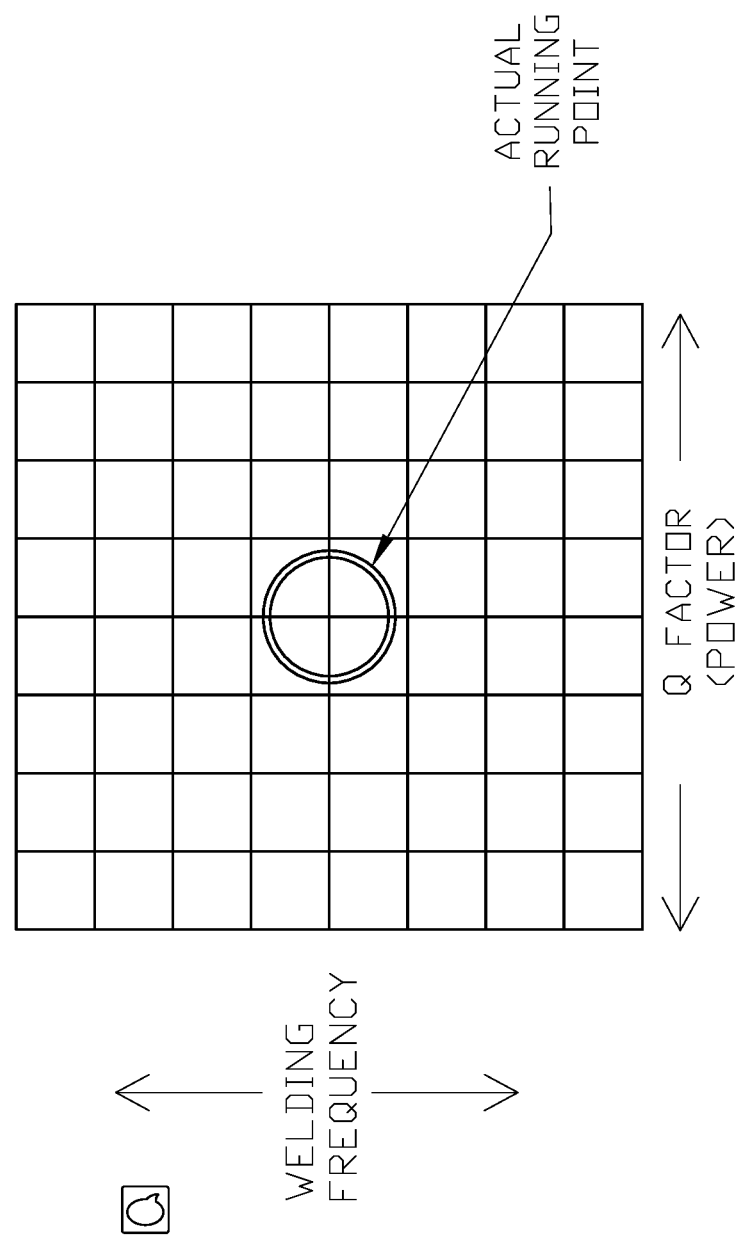

HIGH FREQUENCY POWER SUPPLY SYSTEM WITH CLOSELY REGULATED OUTPUT FOR HEATING A WORKPIECE

CROSS REFERENCE TO RELATED APPLICATIONS

This is a divisional application of application Ser. No. 15/388,573, filed Dec. 22, 2016, which application claims the benefit of U.S. Provisional Application No. 62/270,880 filed Dec. 22, 2015, both of which applications are hereby incorporated by reference in their entireties.

FIELD OF THE INVENTION

The present invention generally relates to high frequency power supply systems with closely regulated inverter outputs that supply power to a workpiece load circuit, such as a work induction coil or resistive contacts, forming part of the power supply load with a workpiece being heated in an industrial process such as welding or annealing, and particularly to such high frequency power supplies where the power magnitude and frequency of the inverter's output is closely regulated and independent of the impedance of the power supply load by providing an inverter output impedance adjusting and frequency control network.

BACKGROUND OF THE INVENTION

Induction welding is a form of welding that uses electromagnetic induction to heat two or more surfaces of a single workpiece, or multiple workpieces, where at least one of the workpieces is at least partially electrically conductive. The heated surfaces are welded together by applying a force between the inductively heated surfaces in an ambient atmosphere or a controlled environment such as an inert gas or vacuum.

One example of an industrial induction welding process is forge welding of a tubular article of manufacture from a processed material such as sheet 104 (workpiece) that is at least partially electrically conductive as graphically illustrated in FIG. 1. In this process the opposing edges 104a and 104b of sheet 104 are inductively heated by the magnetic field established by high frequency alternating current flow through induction coil 106 supplied from a high frequency power supply system not shown in the figure. The inductively heated opposing edges are rolled (forged) together with tooling rolls 108a and 108b to form the tubular article 110 and a weld heat affected zone (HAZ) 113 as sheet 104 moves from right to left in the figure as indicated by the arrows. The induction coil and the magnetically coupled workpiece weld region, along with impedance adjusting devices such as an impeder 112 inserted within the rolled weld region form a weld electric load (workpiece) circuit with dynamically changing load characteristics during the welding process.

Electric resistance welding (ERW) is a form of welding that uses resistance heating to heat two or more surfaces of a single workpiece, or multiple workpieces, where at least one of the workpieces is at least partially electrically conductive. The heated surfaces are welded together by applying a force between the resistively heated surfaces in an ambient atmosphere or a controlled environment such as an inert gas or vacuum.

One example of an industrial electric resistance welding process is forge welding of a tubular article of manufacture from a processed material such as sheet 204 (workpiece) that is at least partially electrically conductive as graphically illustrated in FIG. 2. In the process the opposing edges 204a and 204b of the sheet are resistively heated by alternating current or direct current flow supplied from a direct current or alternating current power supply system not shown in the figure to electric contacts 206a and 206b. The resistively heated opposing edges 204a and 204b are rolled together with tooling rolls 208a and 208b to form the tubular article 210 and a weld HAZ 213 as sheet 204 moves from right to left in the figure as indicated by the arrows. The electric contacts and the workpiece weld zone form a weld electric load (workpiece) circuit with dynamically changing load characteristics during the welding process.

High frequency solid state power supplies used in induction welding processes can also be used in induction heating application, such as annealing (heat treatment) processes, where a metal workpiece or workpiece zone, such as a previously formed weld seam (HAZ), requires heat treatment. The induction coil and the magnetically coupled workpiece heat treatment zone form a weld electric load (workpiece) circuit with dynamically changing load characteristics during the annealing process.

One example of an industrial annealing process is annealing of metal tubular article 302 at the weld seam 304 of the previously weld formed tubular article as illustrated in FIG. 3. Heating of the weld seam (HAZ 306) can be accomplished, for example by supplying a high frequency current to a linear induction coil 308 (diagrammatically shown in the figure) with the tubular article advancing in the direction of the arrow in FIG. 3.

For the above described induction welding process, resistance welding process or induction annealing process the electric load has a dynamically changing load impedance during the welding or heating process that is caused by process variables impacting the load circuit Q (Quality) factor, inductance, resistivity and permeability in the welding or heating zone. The process variables are many, and can include, for example, the chemistry of the workpiece, dimensions of the workpiece (such as a tubular article's circumference or thickness of a workpiece), process temperature, dimension and chemistry of tooling rolls, the output frequency of the welding or heating power supply, process line speed or production rate for the welded or heated article of manufacture, auxiliary mechanical apparatus, induction coil or electric contact dimensions, physical configuration and composition and ferrite elements (for example impeders).

Due to the dynamically changing load characteristics in the electric load circuit during the welding or annealing processes a dynamic load matching subsystem is required between the output of the welding or annealing power supply and the electric load circuit for maximum power transfer from the supply's output to the electric load circuit.

FIG. 4 graphically illustrates one known load matching concept for welding and annealing processes where maximum (100 percent) power transfer occurs at power supply output frequency $f_{res}$ when the Q factor is at a maximum value on the Q curve as determined by resonance of the power supply output impedance and load circuit impedance. As the system runs off resonance, power transfer will diminish based upon the Q factor of the circuit.

A natural resonant circuit will be determined through changes in capacitance and inductance resulting in a shift of the voltage and current ratio or matching as well as a shift or change in frequency. FIG. 4 is an illustration of the natural resonance. The natural resonance can be found by:

$$\text{natural resonant frequency} = \frac{1}{2\pi\sqrt{L \cdot C}}$$

where L is the inductance and C is the reactance of the circuit.

With no matching devices present in the system, meaning internally fixed values of inductance and capacitance, as load changes occur, the power and frequency will naturally shift to different points of the defined Q curve resulting in various power and frequency levels as defined by the load characteristics. In order to achieve maximum power output, meaning voltage and current matched ratio at the desired tuned frequency, the load Q and inductance must match the supply tuned or designed fixed values of capacitance and inductance, chosen peak resonance. Furthermore, the timing of the switching circuit supplying voltage (voltage fed supply) or current (current fed supply) should be designed for maximum power transfer or efficiency to control voltage and current flow to coincide with the resonant point. This maximum power transfer only occurs at this one resonant point of frequency.

There is the need for a high frequency power supply system with closely regulated inverter output that supplies power to a work induction coil or resistive contacts forming part of the power supply workpiece load with the workpiece being heated in an industrial process, such as metal welding and annealing, where the power magnitude and frequency supplied to workpiece load circuit can be independent of the workpiece load characteristics.

BRIEF SUMMARY OF THE INVENTION

In one aspect the present invention is a method of controlling highly regulated power and frequency from a high frequency power supply system for heating a workpiece load in a welding or annealing process. The high frequency power supply system comprises a full bridge or a half-bridge inverter having a plurality of bridge switching devices with single phase inverter output leads. An inverter output impedance adjusting and frequency control network has a control network input connected to the single phase inverter output leads and a control network output. A system microprocessor controller has control interfaces to the plurality of bridge switching devices and to one or more adjustable impedance elements in the inverter output impedance adjusting and frequency control network for control of power transfer from the single phase output of the full bridge or half-bridge inverter to the workpiece load and a variable output frequency from the single phase output of the full bridge or a half-bridge inverter to the workpiece load that can be independent of the impedance of the workpiece load.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims.

FIG. 11(a) and FIG. 11(b) illustrate one example of a high frequency variable reactor of the present invention where a geometrically-shaped pair of variable reactors has a conic shape with a single solid or hollow conductive core insert that can be used in a high frequency power supply system of the present invention.

FIG. 11(c) is a detail of the impedance adjusting and frequency control network in FIG. 6 or FIG. 7 showing where the pair of variable reactors in FIG. 11(a) and FIG. 11(b) can be used for reactor pair 24a-24a' in FIG. 6 or FIG. 7.

FIG. 15(a) through FIG. 15(d) illustrate one example of a high frequency variable reactor of the present invention comprising a pair of two-turn variable reactors of conic shape that can be used in a load matching apparatus of the high frequency power supply system of the present invention.

FIG. 16(a) and FIG. 16(b) illustrate one example of a high frequency variable reactor of the present invention comprising geometrically-shaped pair of variable reactors of conic shape with a single solid or hollow conductive core insert of the present invention that can be used in a load matching and frequency control apparatus of the present invention wherein the stationary split-bus section for each of the variable reactors in the reactor pair are joined together to form a single variable reactor.

FIG. 16(c) is a detail of a modified load matching and frequency control apparatus shown in FIG. 6 or FIG. 7 showing where the high frequency reactor in FIG. 16(a) and FIG. 16(b) can be used in a high frequency power supply system of the present invention.

FIG. 18(a) illustrates one example of a graphical user interface allowing user visualization of a target as a means to indicate the actual running point of a high frequency power supply system of the present invention given the load characteristics and internal capacitance and inductance settings of the high frequency heating power supply system of the present invention.

FIG. 19(a) through FIG. 19(d) illustrate selective non-limiting alternative embodiments of an inverter output impedance adjusting and frequency control network used in some embodiments of the invention either alone or in selective combination of two or more of the arrangements shown in the figures. FIG. 19(a) is an example of where the output impedance adjusting and control network may comprise parallel capacitors that can be either fixed or variable or a combination of both fixed and variable capacitors. FIG. 19(b) is an example of where the output impedance adjusting and frequency control network may comprise series capacitors that can be either fixed or variable or a combination of both fixed and variable capacitors. FIG. 19(c) is an example of where the output impedance adjusting and frequency control network may comprise parallel inductors that can be either fixed or variable or a combination of both fixed and variable inductors. FIG. 19(d) is an example of where the output impedance adjusting and frequency control network may comprise series inductors that can be either fixed or variable or a combination of both fixed and variable inductors.

DETAILED DESCRIPTION OF THE INVENTION

Figure 6:
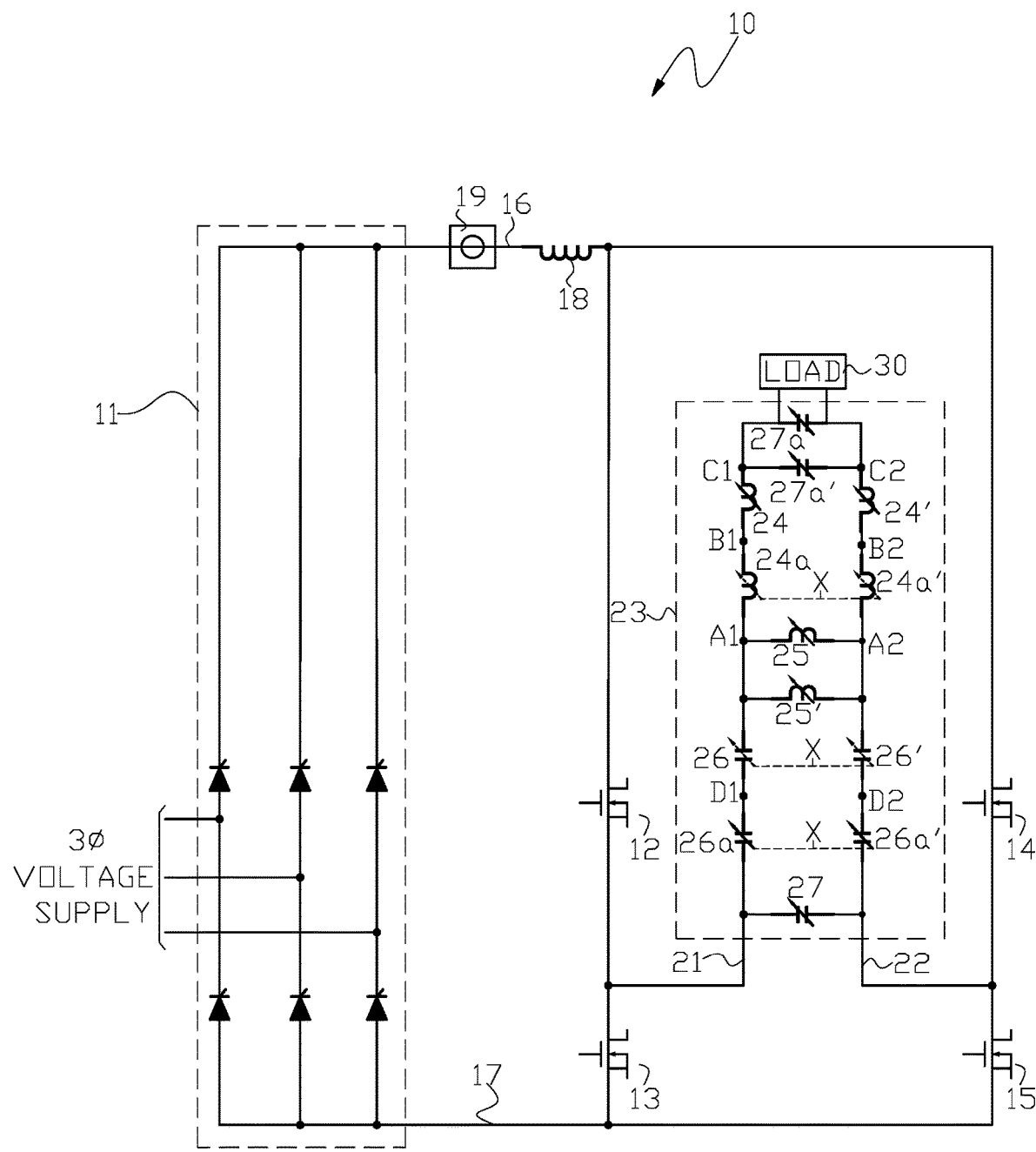
FIG. 6 is one example of a simplified diagram of a high frequency heating power supply system of the present invention utilizing a current source inverter.

FIG. 6 illustrates one embodiment of a high frequency power supply system 10 of the present invention having a closely regulated output for heating a workpiece load 30 in a welding or annealing process where a full bridge current source inverter is utilized. In FIG. 6 rectifier 11 converts three phase alternating current to direct current and is connected to an inverter circuit comprising transistors 12, 13, 14 and 15 through leads 16 and 17 and fixed inductor 18. The transistors may be metal-oxide-semiconductor field-effect transistors or other suitable solid state switching devices. Current sensor 19 provides an output proportional to the current supplied to the inverter and hence, to load 30. When a high frequency power supply heating system of the present invention is used, for example, in an induction welding or annealing application or electric resistance welding application, load 30 includes electrical leads and an induction coil or electric contacts (contacting the portion or portions) to be welded, annealed or otherwise heated.

Figure 7:
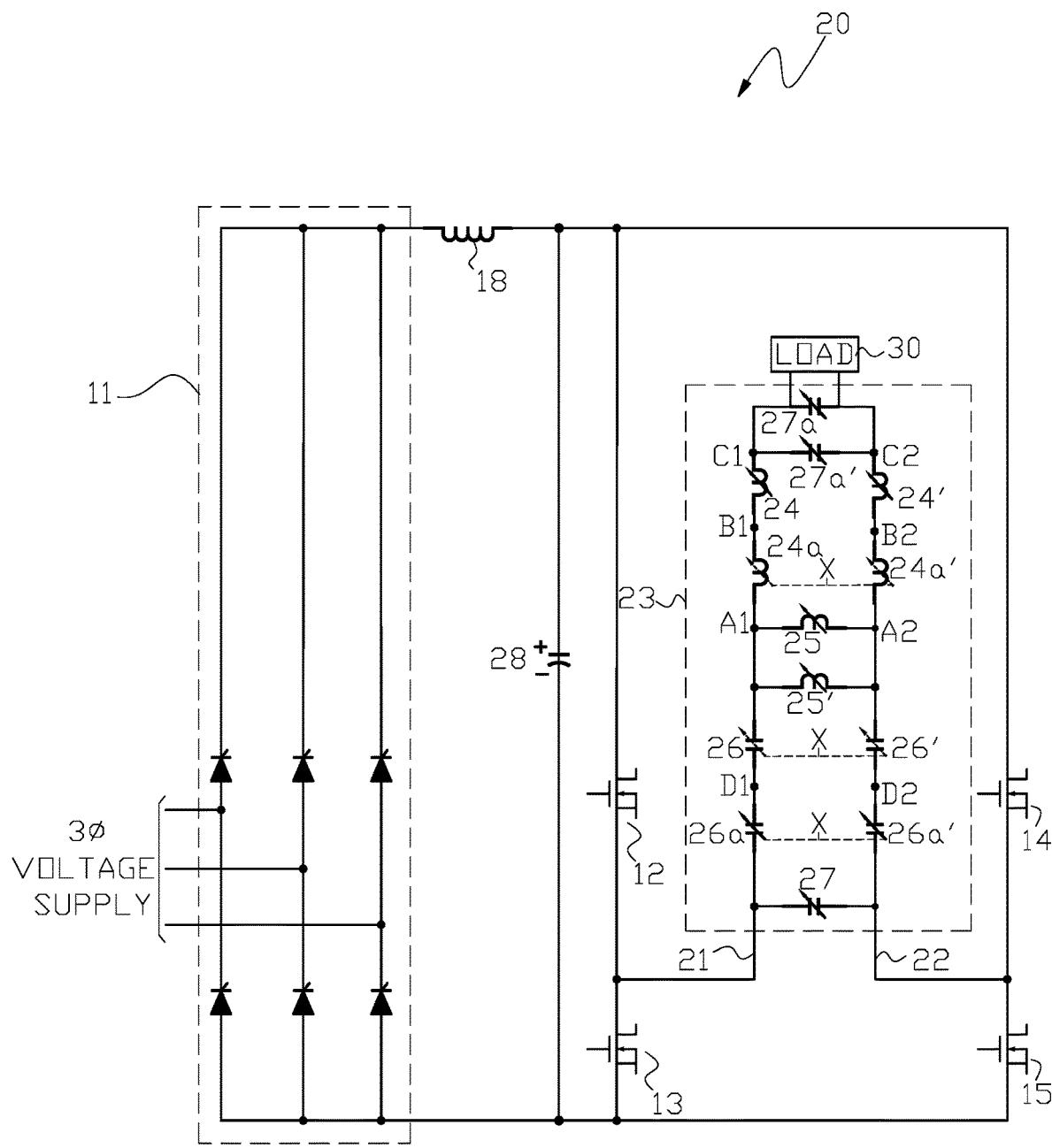
FIG. 7 is another example of a simplified diagram of a high frequency heating power supply system of the present invention utilizing a voltage source inverter.

FIG. 7 illustrates another embodiment 20 of a high frequency power supply system of the present invention where a full bridge voltage source inverter is utilized. Corresponding elements in FIG. 7 are designated by the reference numerals used in FIG. 6. A filtering capacitor 28 is also used in the voltage source inverter of FIG. 7. In alternative embodiments of the invention the inverter may be a half-bridge inverter.

The solid state full bridge inverter in FIG. 6 or FIG. 7 has first single phase inverter output terminal or lead 21 and second single phase inverter output terminal or lead 22 feeding impedance elements in the inverter output impedance adjusting and frequency control network 23.

In the embodiments of the invention shown in FIG. 6 and FIG. 7 the inverter output impedance adjusting and frequency control network 23 comprises:

a combination of a first pair of series variable reactors 24 and 24', a second pair of series variable reactors 24a and 24a', a first pair of series variable capacitors 26 and 26', and a second pair of series variable capacitors 26a and 26a' as arranged and interconnected in the figures;

a combination of a pair of parallel variable reactors 25 and 25' and a pair of parallel variable capacitors 27a and 27a' arranged and connected in parallel between the single phase inverter output leads as arranged and interconnected in the figures; and a parallel variable capacitor 27 arranged and connected in parallel between the single phase inverter output leads as shown in the figures.

In the embodiments of the invention shown in FIG. 6 or FIG. 7 the output impedance adjusting and frequency control network comprises a L-C ladder network where the adjustable capacitive and inductive elements are variably controllable by outputs from a system microprocessor controller, or equivalent control components, executing a welding or annealing process.

In other examples of the invention multiple L-C ladder networks may be interconnected in series or parallel between the first and second single phase outputs leads from the inverter to the load or otherwise different from that shown in FIG. 6 or FIG. 7 to suit the requirements of a particular application. In other embodiments of the invention some of the inductive and capacitive elements in control network 23 may be of fixed values in combination with adjustable inductive and capacitive elements.

In some examples of the present invention, as an alternative to load characteristic independent operation, load impedance changes in FIG. 6 or FIG. 7 that result in changes in reflective reactance and resistance, the inverter output impedance adjusting and frequency control network 23 compensate for the load impedance changes to maintain a desired resonant point.

In some embodiments of the invention the adjustable capacitive and inductive elements are variably controllable by outputs from the system microprocessor controller to: control output power amplitude from the high frequency power supply system to the load; the ratio of output voltage to output current from the power supply system to the load; or the output frequency of the voltage and current from the power supply system to the load, independent of load characteristics such as resonant power amplitude, voltage and current ratio or frequency.

In some embodiments of the invention system microprocessor control of the adjustable reactors and/or capacitors in the inverter output impedance adjusting and frequency control network 23 is used to compensate for changes in characteristics of load 30 so that a resonant point can be maintained regardless of a change in load characteristics. For example if inductance at the load increases, the inductance in the inverter output impedance adjusting and frequency control network can be decreased so that overall equivalent system inductance is maintained, which results in the same resonant point regardless of the change in load characteristics. Further, if the Q factor of the load is decreased, the Q factor in the inverter output impedance adjusting and frequency control network can also be decreased through the system microprocessor controller of the variable capacitance and inductance which results in an equivalent resonant point of power transfer with the characteristics of the high frequency power supply system matching the load characteristics.

In some embodiments of the invention system microprocessor control of the adjustable reactors and/or capacitors in the inverter output impedance adjusting and frequency control network 23 is used to change the natural resonant point of the combination high frequency power supply system and load circuit to a user selected point of natural resonation. For example if the load characteristics remain unchanged, typically under stable welding and heating process conditions, a different value of resonant frequency can be selected through variations of the adjustable inductance and/or capacitance to a user selected point of natural resonance.

In order to obtain maximum power transfer at resonant frequency, the timing of the switching circuit controlling power supply switching can be adjusted through pulse width modulation (PWM) so that maximum power can be transferred to load 30 through the changing output resonant points. PWM technique can also be used to maintain efficiency of transistor switching devices 12, 13, 14 and 15 in FIG. 6 or FIG. 7.

Figure 8A:
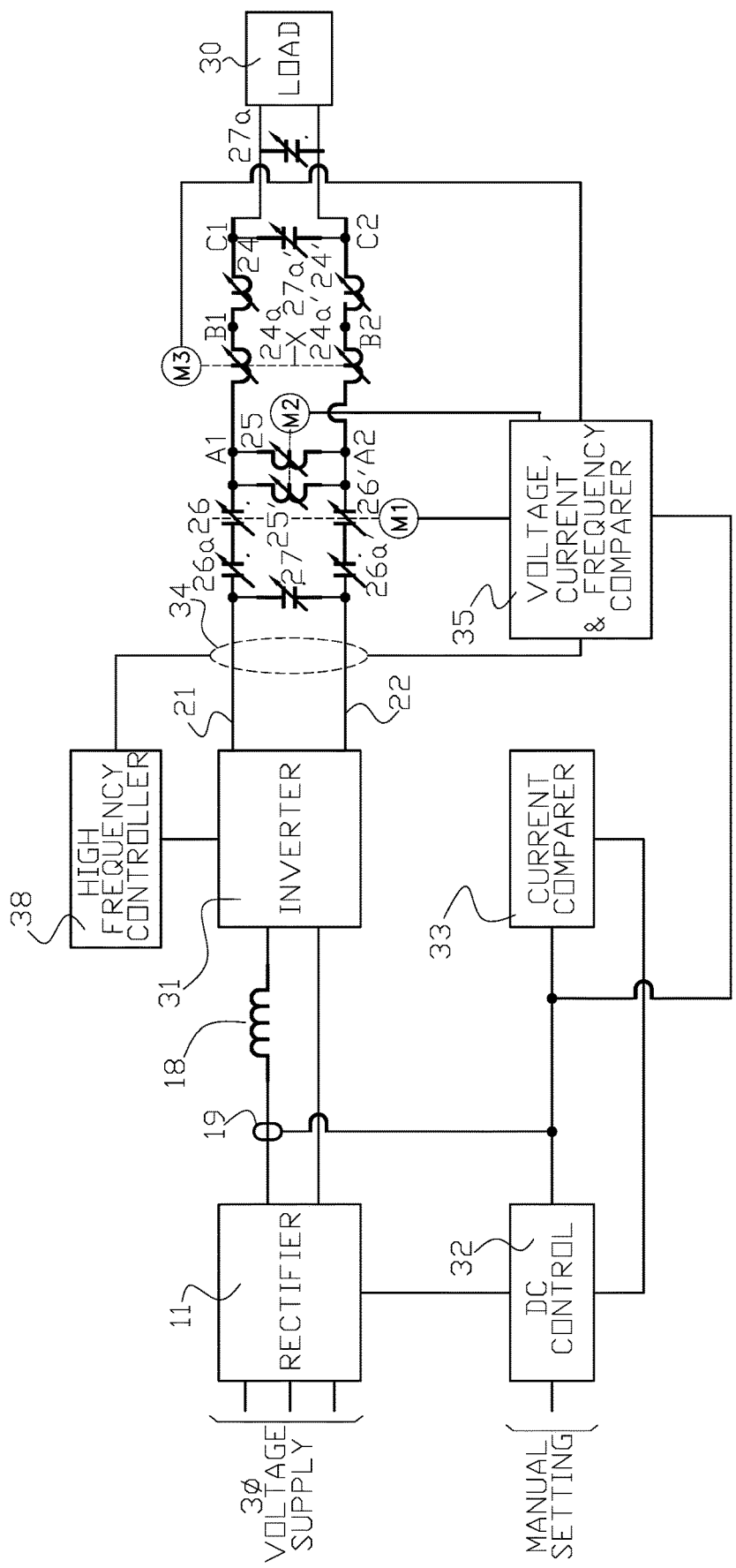
FIG. 8(a) is one example of a simplified control diagram of a control system for a high frequency heating power supply system of the present invention.
Figure 8B:
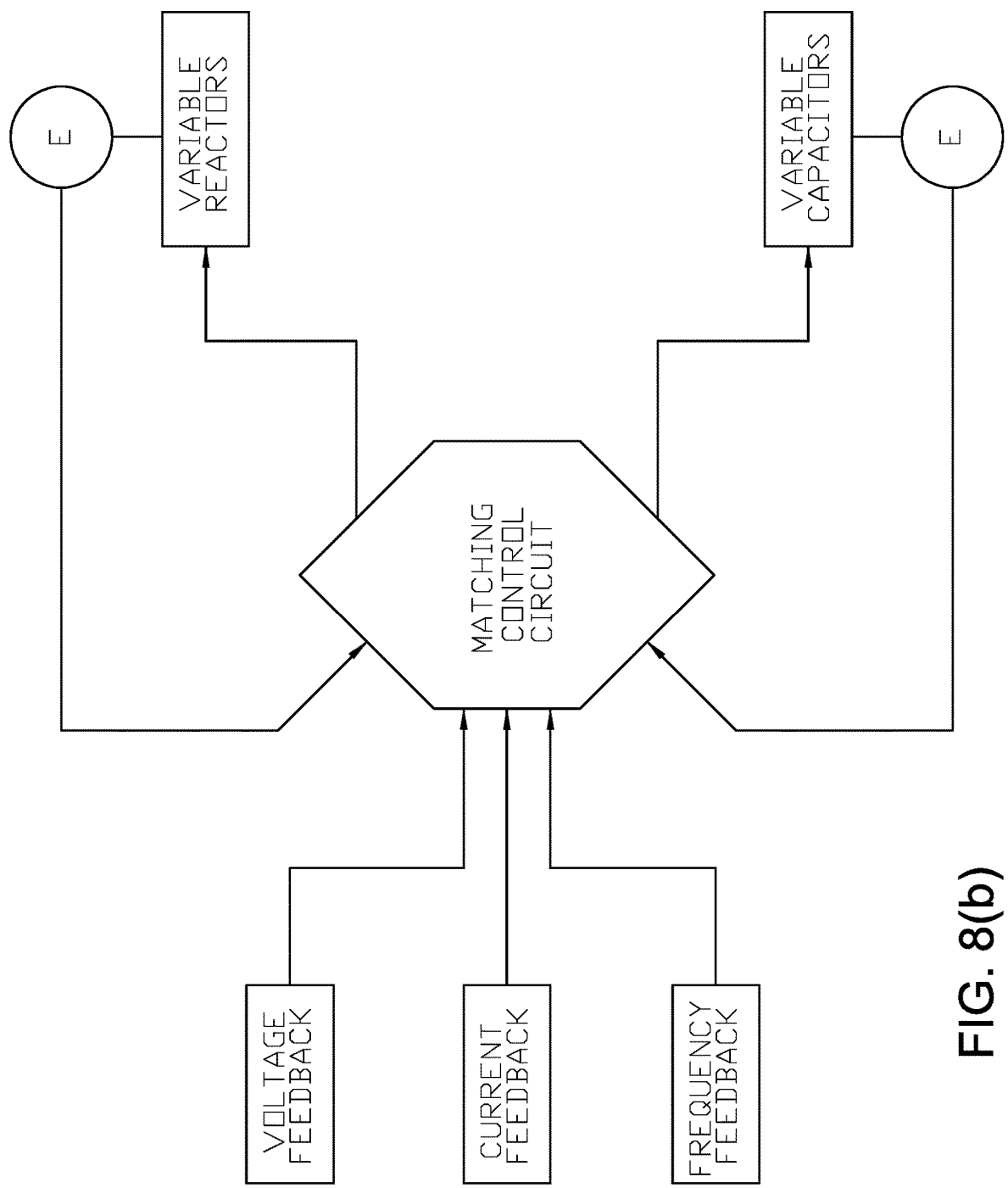
FIG. 8(b) is one example of a simplified control diagram for a tuned response feedback loop for controlled output power (reactance) that can be used with the control system for the high frequency heating power supply system in FIG. 8(a).
Figure 8C:
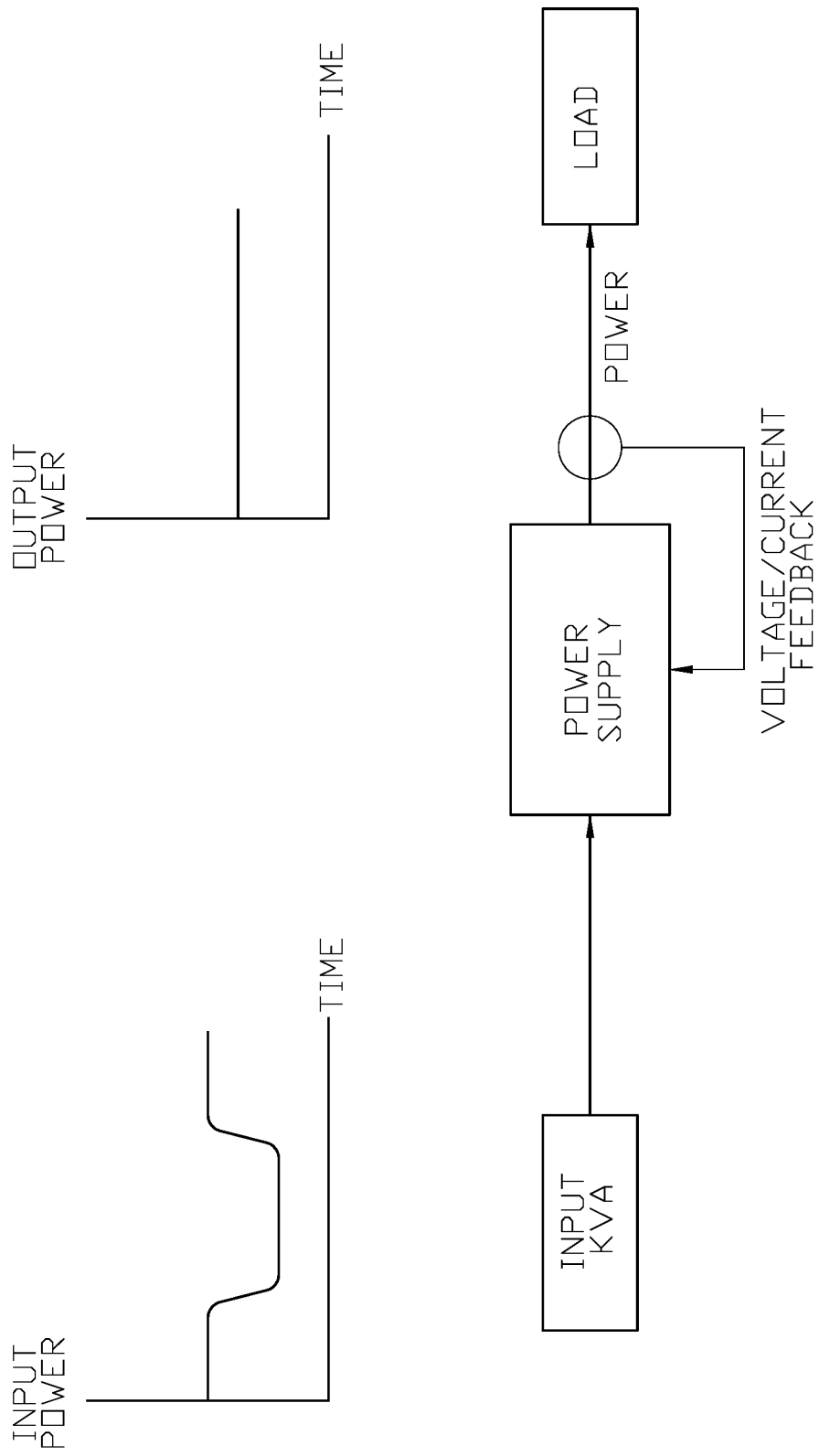
FIG. 8(c) is one example of a simplified control diagram for an output power magnitude control system that can be used with the control system for the high frequency heating power supply system in FIG. 8(a) to control output power regulation to compensate for input power fluctuations.

System control elements shown in FIG. 8(*a*) through FIG. 8(*c*) can be provided in a system microprocessor controller or equivalent one or more control components. System control elements can include the high frequency controller, voltage, current and frequency comparer and current comparer in FIG. 8(*a*), the matching control circuit in FIG. 8(*b*) and voltage/current feedback circuit in FIG. 8(*c*).

Sensor feedback to the system microprocessor controller can be provided for any adjustable reactors to sense positioning of a reactor moveable component (as a function of variable inductance value); voltage across the reactor and current through the reactor as shown in FIG. 8(*a*) and FIG. 8(*b*). Similarly sensor feedback to the system microprocessor controller can also be added for any adjustable capacitors to sense positioning of a capacitor moveable component (as a function of variable capacitance value), voltage across the capacitor and current through the capacitor. These adjustable reactor and capacitor measurements are used for the closed loop control to maintain and adjust set outputs. Output power from the inverter output impedance adjusting and frequency control network to the load, output current from the control network to the load and output frequency from the control network is measured in some embodiments of the invention to detect the precise resonance point, power to the load and change of impedance at the load.

In some embodiments of the invention from the sensors' feedback of measured voltage, current and frequency, the measurement signals are then supplied to a measurement comparator as shown in FIG. 8(*a*) to produce an output adjustment control signal to individual actuators (M) associated with each variable reactor or capacitor. These output adjustment control signals are used to precisely control movements of the moveable components associated with each variable reactor and/or capacitor to maintain either a resonant point or an off resonant point as determined by the system microprocessor controller.

In some embodiments of the invention the system microprocessor controller operates as an open loop system controller to allow the resonant point of the high frequency power supply system to change with the load impedance and either adjust an existing microprocessor output control of the inverter's switching devices to maintain maximum output power transfer or maintain the existing microprocessor output control of the inverter's switching devices for less than maximum output power transfer as the system moves off resonance.

Alternatively in other embodiments of the invention the system microprocessor controller operates as a closed loop control controller to move the system resonant point to a user selected output frequency is inputted to the microprocessor controller and either adjust an existing microprocessor output control of the inverter's switching devices to maintain maximum output power transfer or maintain the existing microprocessor output control of the inverter's switching devices for less than maximum output power transfer as system moves off resonance.

FIG. 8(*b*) is one example of a control block diagram for some embodiments of the high frequency power supply system that can be utilized with the high frequency heating power supply control system illustrated in FIG. 8(*a*) as HIGH FREQUENCY CONTROLLER 38 and VOLTAGE, CURRENT & FREQUENCY COMPARER 35.

FIG. 8(*c*) is one example of a power magnitude control block diagram that can be utilized with the high frequency heating power supply control system illustrated in FIG. 8(*a*) where the control system has the ability to maintain regulation of output power to compensate for input power fluctuations and changes.

Figure 1:
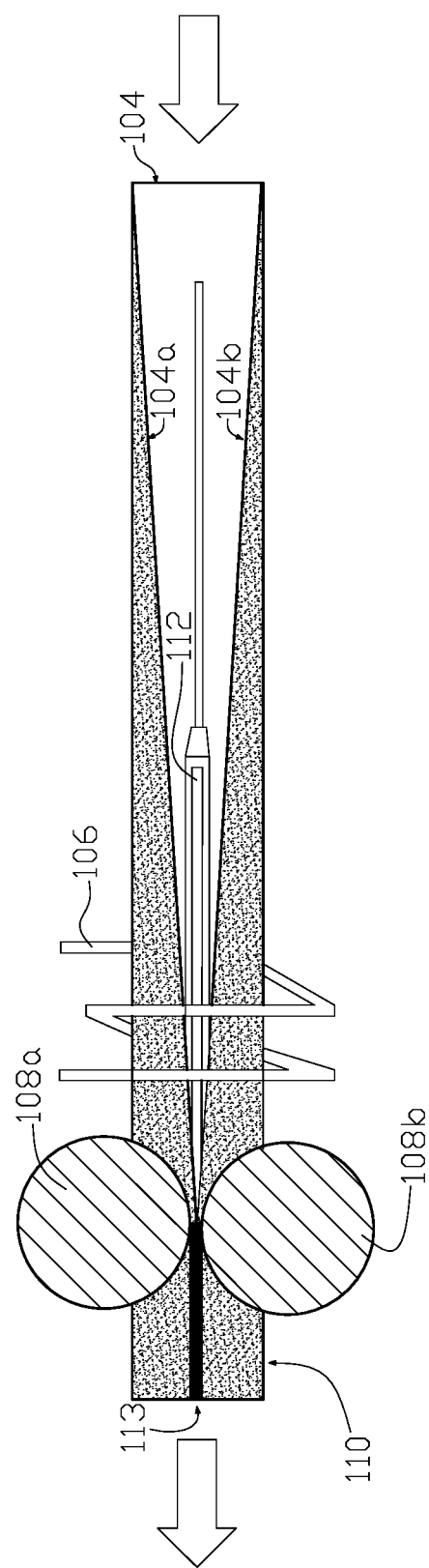
FIG. 1 is a graphical illustration of a forge welding power supply output load circuit comprising an induction coil and the opposing edge portions of a metal sheet being folded to form a tubular article of manufacture in a forge welding process.
Figure 2:
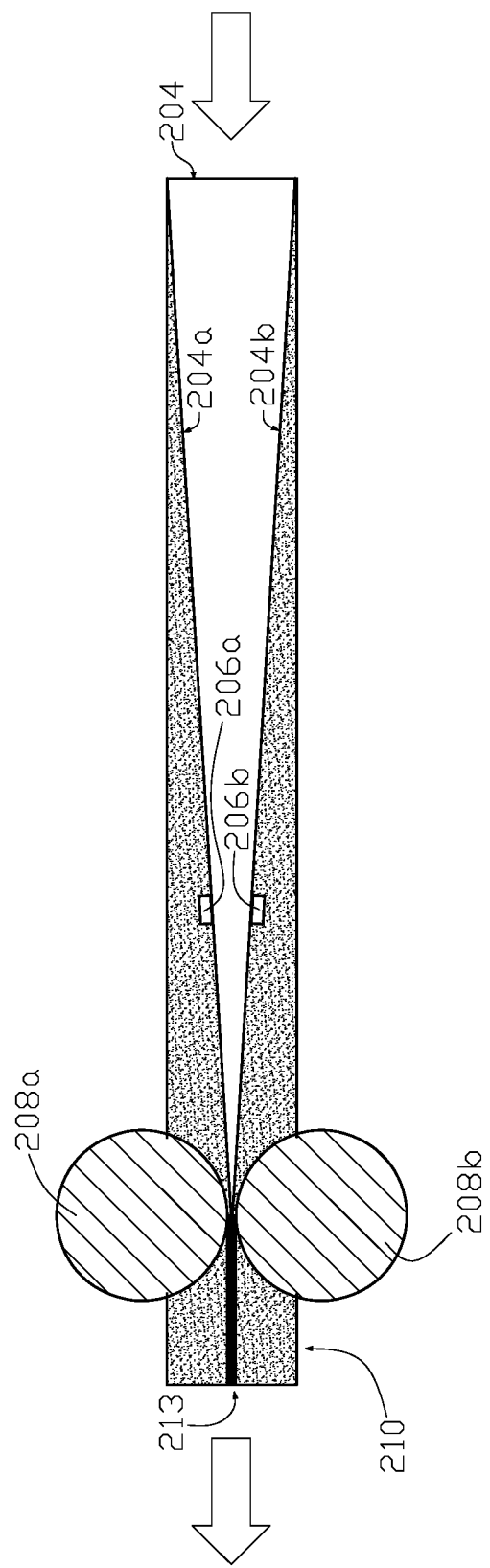
FIG. 2 is a graphical illustration of a forge welding power supply output load circuit comprising a pair of resistance contacts and opposing edge portions of a metal sheet being folded to form a tubular article of manufacture in an electric resistance welding process.
Figure 3:
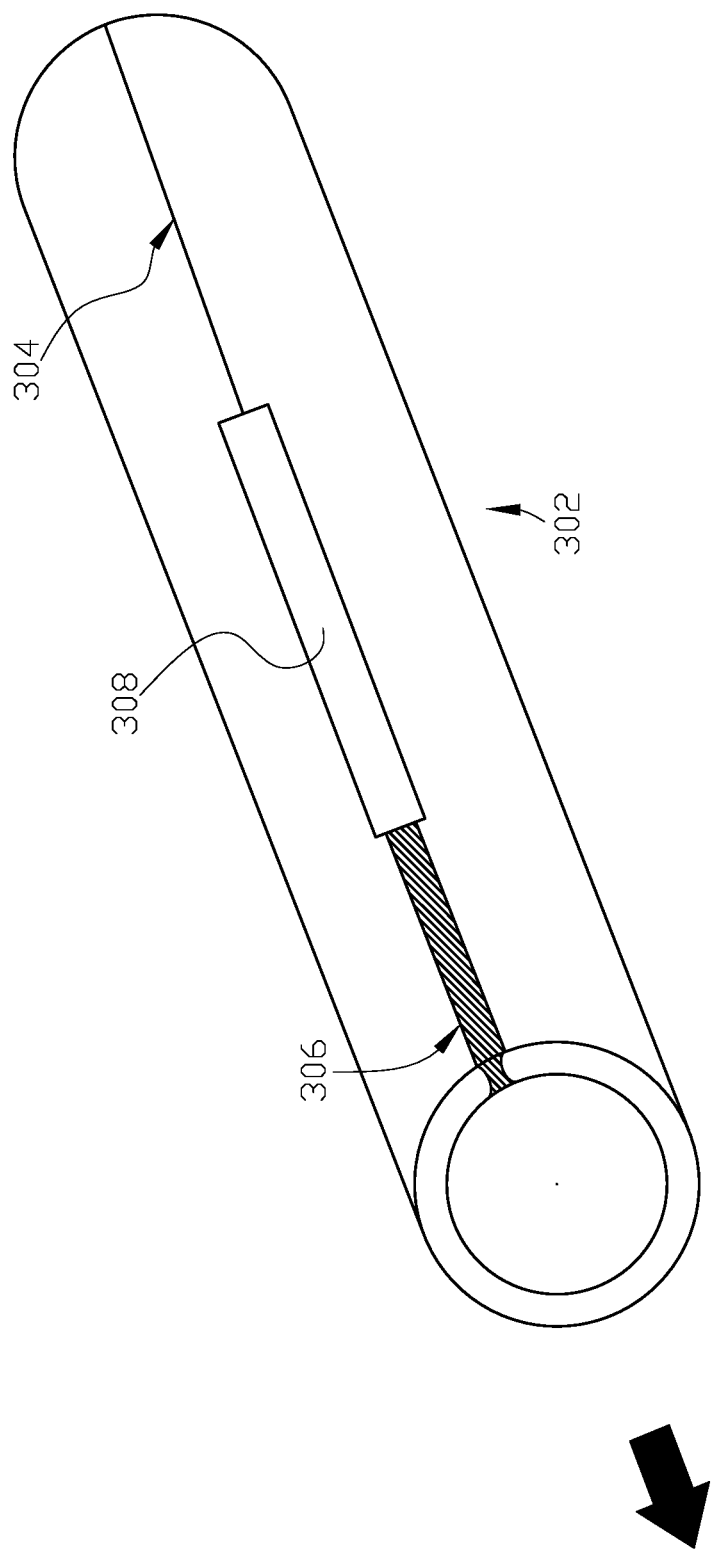
FIG. 3 is a graphical illustration of an annealing power supply output load circuit comprising an induction coil and the metal zone to be annealed, for example, a previously welded seam of a tubular article of manufacture.
Figure 4:
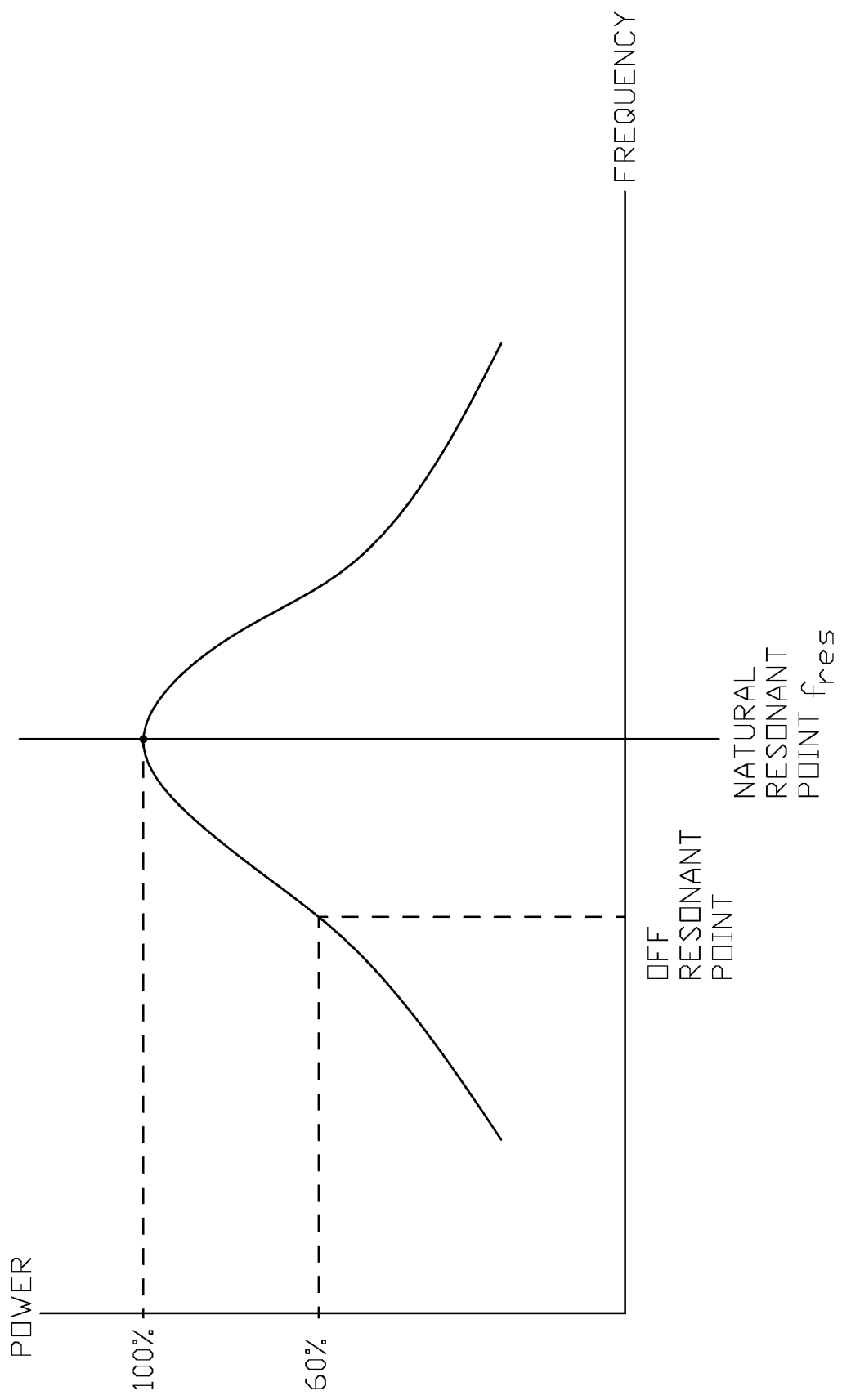
FIG. 4 graphically illustrates one known method of load matching for induction welding and annealing and electric resistance welding.
Figure 5:
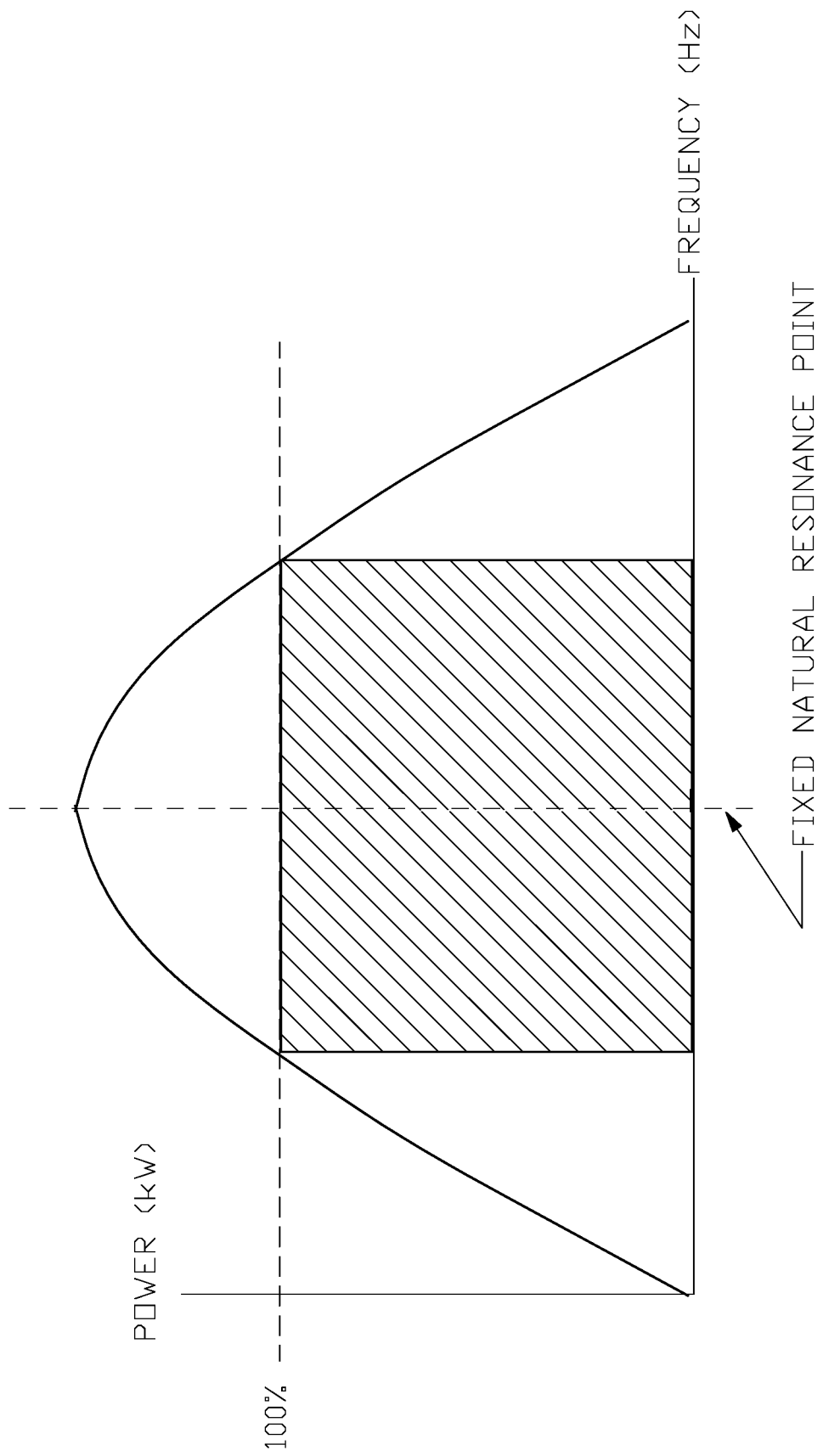
FIG. 5 graphically illustrates a method of obtaining maximum power to a load through the use of added KVA to compensate for running off resonance point for induction welding and annealing, and electric resistance welding.
Figure 9:
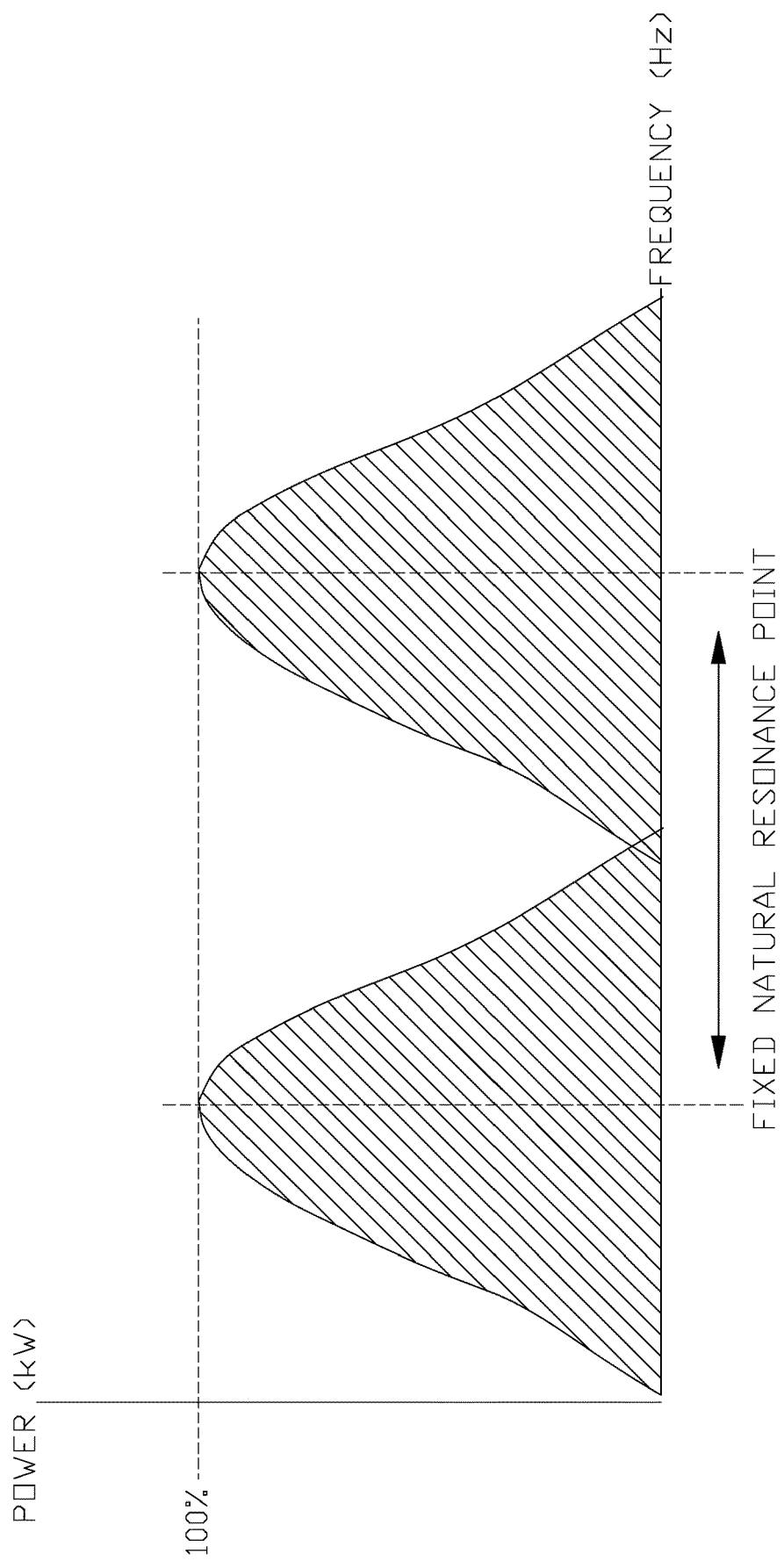
FIG. 9 graphically illustrates one example of a performance diagram with a continuously variable and controllable natural resonance point for a high frequency control heating power supply system of the present invention.

FIG. 9 diagrammatically illustrates operation of a high frequency heating power supply system of the present invention. The electronic load matching process graphically illustrated in FIG. 9 uses hard switching processes in combination with adjustable reactor and/or capacitor components of the present invention. In hard switching processes of the present invention hard turn-on is characterized by a total commutation voltage drop over the current-carrying switching device at a current commutation time, and hard turn-off is characterized by the voltage increasing up to the value of the commutation voltage while the current continues flowing, before it drops. A hard turn-on or a hard turn-off causes high power loss peaks in an inverter's switching device. In an alternative mode of operation the curve in FIG. 5 represents a method for obtaining a stated maximum output power. This method requires added KVA to the input to achieve the maximum power when off resonant point. Conversely the curve in FIG. 9 represents one method of the present invention for obtaining maximum output power by hard switching and variable inductive and capacitive reactance control of network 23 to shift the resonant point as the impedance of the load changes.

Figure 10:
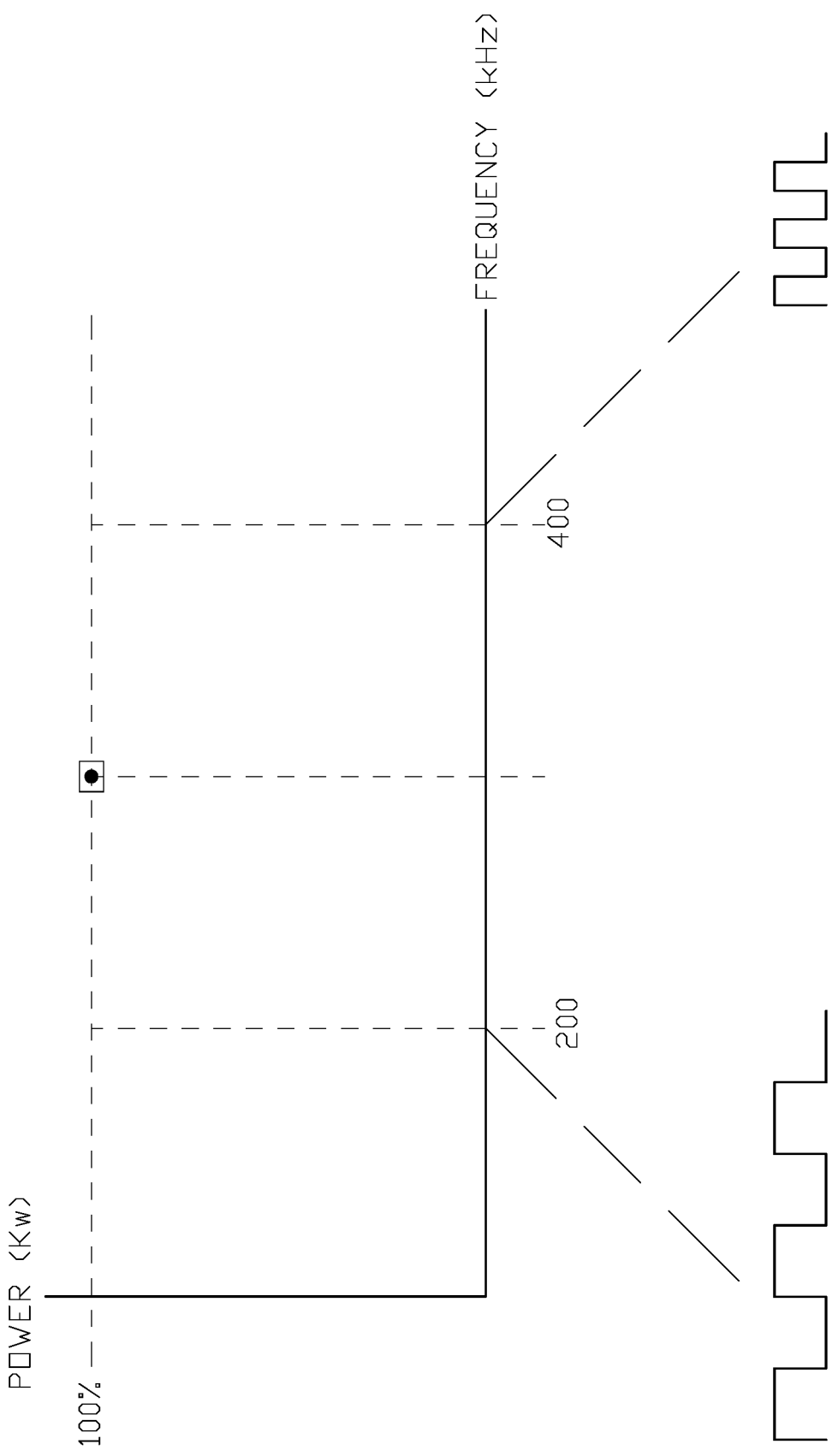
FIG. 10 graphically illustrates another example of a performance diagram for low frequency and high frequency pulse width modulation for a high frequency control heating power supply system of the present invention.

FIG. 10 graphically illustrates an alternative PWM modulated variable switching frequency power supply that can be used with the output impedance adjusting and frequency control network of the present invention or with a fixed arrangement of inductors and capacitors. If field-effect transistors are used in the inverter, for maximum efficiency and power transfer of the inverter's field-effect transistor switching, PWM techniques can be used to control the timing of the transistor switching.

In some embodiments of the invention one or more of the adjustable reactor pairs can be formed from an open volume space between two current carrying buses and a single core inserted at a variable position into the open volume interleaving space, where reducing the volume and area results in lower inductance. The configuration of the open volume space can be, for example, in the form of a geometric shape such as a box, trapezoid, triangular, cone, oval or egg, or any other open volume geometric shape into which a reactor core can be inserted. The open volume space is selected based on the maximum inductance required for each of the pair of reactors. The core comprises an inverse shape of the open volume shape into which it is inserted to form a precise equivalent clearance between the core and leads around the entire boundary of the inductive area so that when the core is fully inserted into the open volume space a minimum value inductance is maintained for each of the pair of variable reactors. The core will then be moveable, either manually or automatically through the uses of a motor or other actuator, resulting in an analog change in inductance from minimum to maximum as the core is withdrawn from within the open volume space. The taper of the geometric shape of the open volume space and core can be configured for a particular application to result in, for example: a linear change in inductance, logarithmic change of inductance or other curve shape depending on impedance load matching conditions for a particular application. Either the motor or other actuator provides precise feedback to the matching control circuit in the system microprocessor controller through a position sensor means such as encoder E as shown in FIG. 8(b), or alternatively the actuation or movement of the core in or out of the open volume space will be adapted to give precise measurement of distance correlating to a change of inductance. Alternatively the change in inductance can also be derived by the system microprocessor controller from the amount of voltage generated for a given change of rate in current from the equation:

$$V(t) = L^{di/dt}$$

where V(t) is equal to the voltage across each of the adjustable reactor pair as a function of time, L is equal to inductance in henries, and di/dt is equal to the instantaneous rate of current change in amperes per second.

In the present invention, any of the variable reactor pairs 24-24', 24a-24a' and 25-25' in the impedance adjusting and frequency control network 23 in FIG. 6 or FIG. 7 can be formed from a geometrically-shaped pair of reactors having a single moveable geometrically-shaped insert core and a stationary split-bus that are constructed in one embodiment of the invention from electrically conductive sheet materials, such as copper, as shown, for example, as complementary conic sections, wedge (a polyhedron defined by two triangles and three trapezoid faces) sections or a parabolic conic sections as respectively illustrated in FIG. 11(a) and FIG. 11(b), FIG. 13 or FIG. 14. As the short-circuited insert core section is moved inward or outward in relation to the complementary bus section, the magnitude of induced current in the short-circuited insert core section establishes a variable magnetic flux field coupling with the field created by current flow in the complementary bus section to establish a variable inductance at the terminals of the alternating current (AC) buses for each of the pair of inductors that can have a range of variable inductance from a minimum value when the geometric insert core section is fully inserted into the complementary geometric bus section to a maximum value when the geometric insert core section is withdrawn to position where the magnetic field coupling between the short-circuited insert core section and the geometric bus section is the largest. Primarily the geometric forms of the magnetically interacting insert core section and the bus elements selected for a particular application determine the degree of precision in the variation of inductance that can be achieved with this geometrically-shaped inductor, which degree of precision relates to the degree of precision regulation in the output frequency of the power supply when the power supply control system is executing a heating process.

For example in one embodiment of the invention, there is shown in FIG. 11(a) and FIG. 11(b) variable reactor pair 60 where a single short-circuited geometrically-shaped insert core section 62 is moved in or out of complementary geometrically-shaped split bus conic sections 64a and 64b of stationary spilt-bus section 64 as shown by the double headed arrows in FIG. 11(a) and FIG. 11(b). The magnitude of induced current in the insert core section 62 establishes a variable magnetic flux field (also referred to as the variable energy field) from alternating current flow in the complementary geometrically-shaped split bus conic sections 64a and 64b of stationary split-bus section 64 to establish a variable inductance at the split electric bus terminal sections A1-B1 and A2-B2 of the alternating current buses for each of the pair of reactors that can have a range of variable inductance from a minimum inductance valve when the geometrically-shaped insert core section 62 is fully inserted into the complementary geometrically-shaped split conic bus sections 64a and 64b to a maximum inductance value when the geometrically-shaped insert core section 62 is withdrawn to a position, for example as shown in FIG. 11(a), where the variable energy field in the shaped interleaving space between the insert core section 62 and stationary spilt-bus section 64 is at maximum value. FIG. 11(c) illustrates variable reactor pair 60 connected in the high frequency power supply system of FIG. 6 or FIG. 7 as variable reactor pair 24a-24a'. Stationary split bus section 64 comprises electrically isolated split conic bus sections 64a and 64b and split electric bus terminal sections A2 and B2 (associated with conic bus section 64a) and split electric bus terminal sections A1 and B1 (associated with conic bus section 64b). That is, electrically interconnected conic bus section 64a and split electric bus terminal sections A2 and B2 are spatially separated from electrically interconnected bus section 64b and terminal sections A1 and B1.

The geometric form of the magnetically interacting moveable insert core section and the stationary bus elements are selected for a particular application based on the degree of precision in the variation of inductance that can be achieved with the geometrically-shaped reactor pair, which degree of precision relates to the degree of precision regulation in the output frequency of the high frequency power supply of the present invention.

Each geometrically-shaped reactor pair comprises a pair of reactors, for example, reactor pairs 24-24', 24a-24a' and 25-25' in FIG. 6 or FIG. 7 that are adjustable in pairs as indicated, for example, by dashed line interconnection X in FIG. 6 or FIG. 7, for example for reactor pair 24a and 24a', by movement of the insert core section 62 into or out of the geometrically-shaped split bus section of stationary split-bus section 64 as shown in FIG. 11(*a*) and FIG. 11(*b*) with an actuator M' in FIG. 11(*a*) and FIG. 11(*b*) attached to the moveable insert core or motor M3 as shown in FIG. 8(*a*).

Figure 12B:
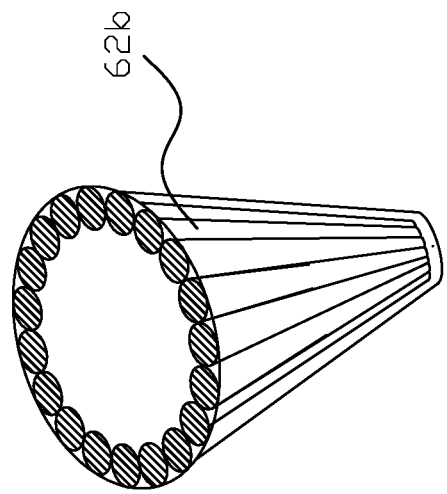
FIG. 12(b) illustrates one example of a single geometrically-shaped insert core formed from an array of ferrite rods that can be used in the pair of reactors shown in FIG. 11(a) and FIG. 11(b).
Figure 12A:
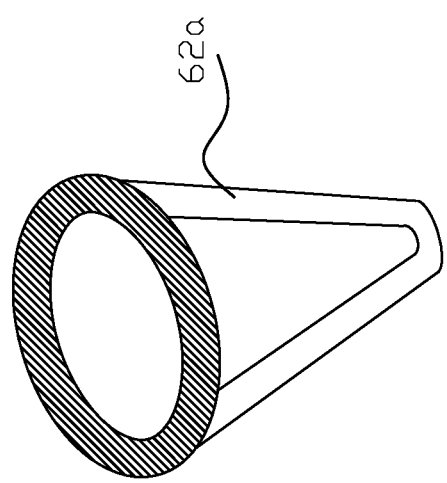
FIG. 12(a) illustrates one example of a single geometrically-shaped insert core formed from a solid or hollow ferrite that can be used in the pair of variable reactors shown in FIG. 11(a) and FIG. 11(b).

FIG. 12(*a*) and FIG. 12(*b*) illustrate use of a magnetic material (for example ferrite 62a) for the conic core insert section 62 with the conic shaped reactor pair 60 in FIG. 11(*a*) and FIG. 11(*b*). In FIG. 12(*a*) the conic core insert section 62a comprises a solid or hollow magnetic material core insert section. In FIG. 12(*b*) the conic core insert section 62bcomprises an array of ferritic rods forming the outer perimeter of the core insert section.

Figure 13:
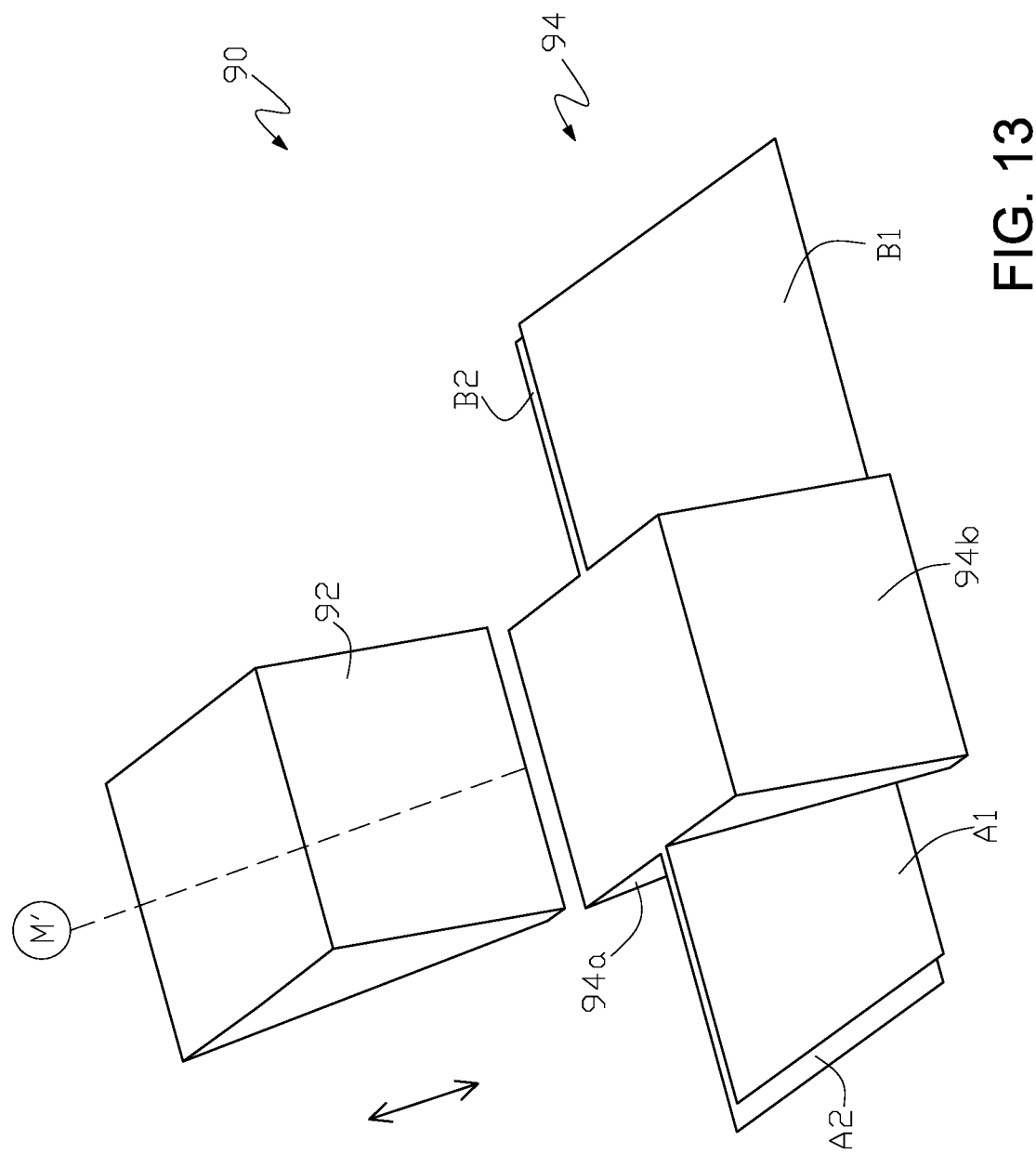
FIG. 13 illustrates one example of a high frequency variable reactor of the present invention where a geometrically-shaped pair of variable reactors has a wedge shape that can be used in a frequency power supply system of the present invention.

FIG. 13 illustrates another example of a high frequency variable reactor 90 of the present invention that can be used with a high frequency power supply system of the present invention. The high frequency variable reactor 90 comprises a single short-circuited insert core section 92 in the geometric shape of a polyhedron defined by two triangles and three trapezoid faces, which is identified here by its common name as a wedge section, that is moved in or out of the stationary complementary geometrically-shaped split wedge bus sections 94a and 94b of stationary spilt-bus section 94 as shown by the double headed arrows in FIG. 13. The magnitude of induced current in the insert core section 92 establishes a variable magnetic flux field (also referred to as the variable energy field) from alternating current flow in the complementary geometrically-shaped split wedge bus sections 94a and 94b of stationary split-bus section 94 to establish a variable inductance at the split electric bus terminal sections A1-B1 and A2-B2 of the alternating current buses for each of the pair of reactors that can have a range of variable inductance from a minimum inductance valve when the geometrically-shaped insert core section 92 is fully inserted into the complementary geometrically-shaped split conic bus sections 94a and 94b to a maximum inductance value when the geometrically-shaped insert core section 92 is withdrawn to a position where the variable energy field in the shaped interleaving space between the insert core section 92 and stationary spilt-bus section 94 is at a maximum value. Variable reactor pair 90 is connected in the high frequency power supply system of FIG. 6 or FIG. 7 as variable reactor pair 24-24', 24a-24a' and/or 25-25'. Stationary split-bus section 94 comprises electrically isolated split wedge bus sections 94a and 94b and split electrical bus terminal sections A2 and B2 (associated with wedge bus section 94a) and split electric bus terminal sections A1 and B1 (associated with wedge bus section 94b). That is, electrically connected bus section 94a and terminal sections A2 and B2 are spatially separated from electrically connected bus section 94b and terminal sections A1 and B1.

Figure 14:
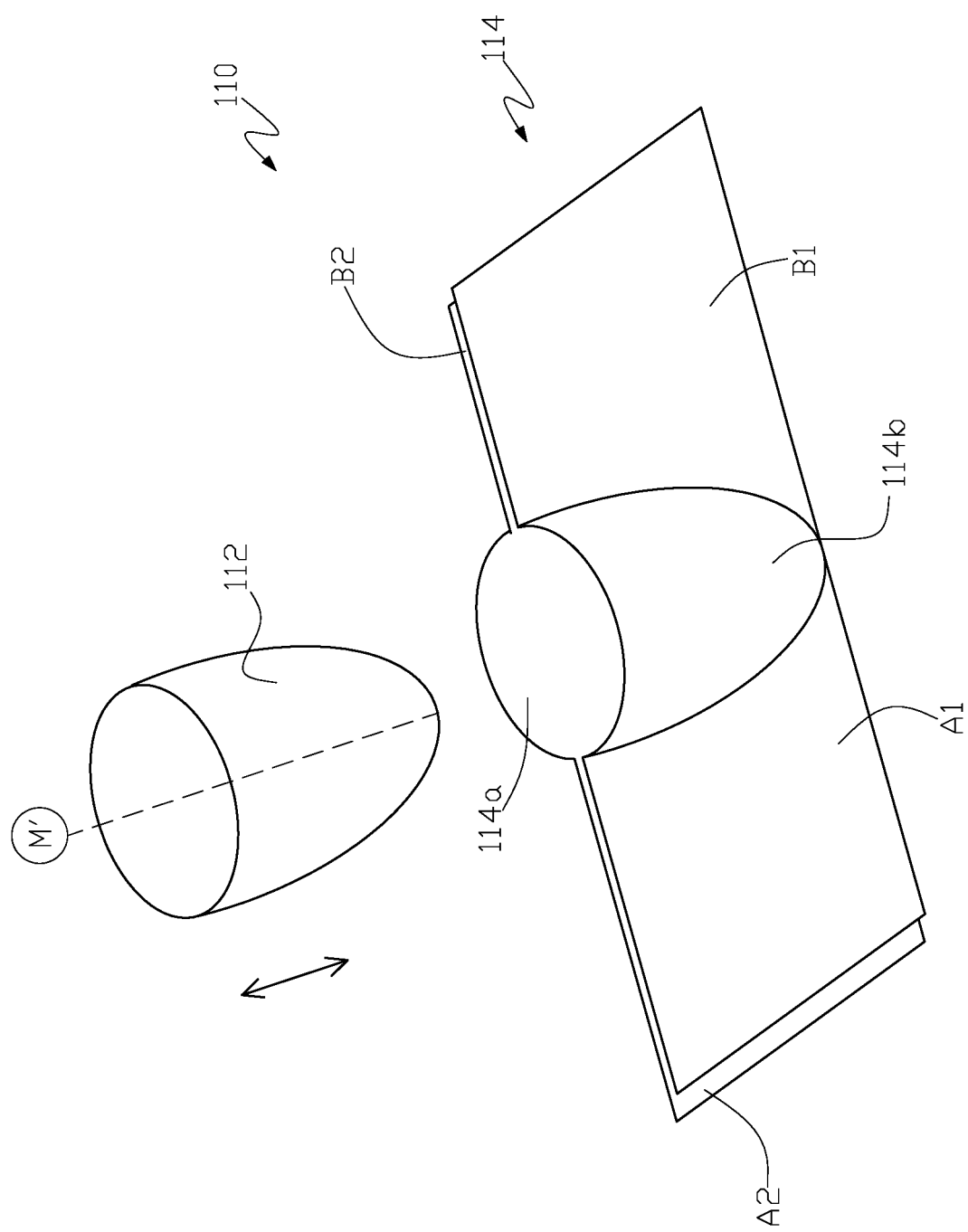
FIG. 14 illustrates one example of a high frequency variable reactor of the present invention where a geometrically-shaped pair of variable reactors has an elliptic paraboloid shape that can be used in a high frequency power supply system of the present invention.

FIG. 14 illustrates another example of a high frequency variable reactor 110 that can be used with a high frequency power supply system of the present invention. The high frequency variable reactor 110 comprises a single short-circuited insert core section 112 in the geometric shaped of an elliptic paraboloid that is moveable in or out of the stationary and complementary geometrically-shaped split elliptic paraboloid bus sections 114a and 114b of stationary spilt-bus section 114 as shown by the double headed arrows in FIG. 14, the magnitude of induced current in the insert core section 112 establishes a variable magnetic flux field (also referred to as the variable energy field) from alternating current flow in the complementary geometrically-shaped split conic bus sections 114a and 114b of stationary split-bus section 114 to establish a variable inductance at the split-electrical bus section terminals A1-B1 and A2-B2 of the alternating current buses for each of the pair of reactors that can have a range of variable inductance from a minimum inductance valve when the geometrically-shaped insert core section 112 is fully inserted into the complementary geometrically-shaped split conic bus sections 114a and 114b to a maximum inductance value when the geometrically-shaped insert core section 112 is withdrawn to a position where the variable energy field in the shaped interleaving space between the insert core section 112 and stationary spilt-bus section 114 is at a maximum value. Variable reactor pair 110 is connected in the high frequency power supply system of FIG. 6 or FIG. 7 as variable reactor pair 24-24', 24a-24a' and/or 25-25'. Stationary split electric bus section 114 comprises electrically isolated split conic bus sections 114a and 114b and split electric bus terminal sections A2 and B2 (associated with elliptic paraboloid bus section 114a) and split electric bus terminal sections A1 and B1 (associated with elliptic paraboloid bus section 114b). That is electrically connected bus section 114a and terminal sections A2 and B2 are spatially separated from electrically connected bus section 114b and terminal sections A1 and B1.

In other examples of the invention the geometrically shaped high frequency reactor of the present invention can be in other geometric forms, for example, pyramidal, depending upon the variable inductance profile required for a particular application which is a function of the shaped interleaving space between the geometrically-shaped insert core section and the stationary spilt-bus section. For example an application where a particular high frequency variable reactor requires a linear or logarithmic change in inductance to achieve heating with a high frequency electrical heating system of the present invention a particular geometric shape may provide a more closely regulated inductance profile over another geometric shape.

FIG. 15(*a*) through FIG. 15(*d*) illustrate one embodiment of a high frequency variable reactor 70 of the present invention that can be used with a high frequency power supply system of the present invention. The high frequency variable reactor 70 comprises a two-turn variable inductor pair 70 where the geometric shape is a conic section and each variable reactor in a pair, for example, reactors 24a and 24a' in FIG. 6 or FIG. 7 has its own conically-shaped insert core section 72a and 72b, respectively, and its own conically-shaped two-turn split bus section 74a and 74b respectively. First stationary split bus section comprises electrically isolated two-turn split bus section 74a and split electric bus terminal sections A1 and B1 (connected to two-turn split bus section 74a) and second stationary split bus section comprises electrically isolated two-turn split bus section 74b and split electric bus terminal sections A2 and B2 (connected to two-turn split bus section 74b). That is electrically connected two-turn split bus section 74a and terminal sections A1 and B1 are spatially separated from electrically connected two-turn split bus section 74b and terminal sections A2 and B2.

FIG. 16(a) and FIG. 16(b) illustrate another example of a high frequency variable reactor 120 of the present invention that can be used with a high frequency power supply system of the present invention. The embodiment shown in FIG. 16(a) and FIG. 16(b) is similar to that shown in FIG. 11(a) and FIG. 11(b) except that the split electric bus terminal sections A1 and A2 are electrically connected together at bus terminal A1' and B1 and B2 are electrically connected together at bus terminal B1' so that the pair of variable reactors form a single reactor 120. In this embodiment the inductor pair is configured as a single inductor 120 between bus terminals A1' and B1' as shown in FIG. 16(c) which in some embodiments of the invention replaces the variable series reactor pair 24a and 24a' with the single variable reactor 120. Similarly the other reactor pairs in FIG. 6 or FIG. 7 may be replaced with a single reactor by modifying the reactor pair as shown in FIG. 16(a) and FIG. 16(b).

In some examples of the high frequency power supply system of the present invention an inductor with a fixed value of inductance may be combined in series with any one or more of the variable reactors in a reactor pair of the present invention.

The moveable insert core section for each of the geometrically-shaped pair of high frequency variable reactors of the present invention can be moved in or out of the stationary geometrically-shaped split bus section with a suitable actuator, for example motor M2 and M3 as shown in FIG. 8(a) for reactor pairs 24a-24a' and 25-25', respectively, where the motor, for example, has a linear, reversible output connection to the insert core section as diagrammatically indicated in the figures with a dashed line connected to the moveable insert core section and an actuator M', as shown, for example, in FIG. 11(a) and FIG. 11(b).

Heating of a geometrically-shaped pair of high frequency variable reactors of the present invention can be dissipated by circulation of a cooling medium, for example, in a cooling tube in thermal contact with the stationary split-bus section and/or the moveable insert core section.

In other examples of the invention the geometrically shaped reactor pair can be in other geometric forms, for example, pyramidal, depending upon the variable inductance profile required for a particular application. For example an application where a particular reactor requires a linear or logarithmic change in inductance to achieve heating with a high frequency power supply system of the present invention a particular geometric shape may provide a more closely regulated inductance profile over another geometric shape.

Full insertion of a moveable insert core to achieve minimum inductance for a particular application can be determined by measuring the inductance when an insert core is positioned at a location within the geometrically-shaped split bus section and then withdrawing the insert core to the position at which the application's maximum required inductance is achieved for setting the maximum inductance position of the insert core.

Figure 17C:
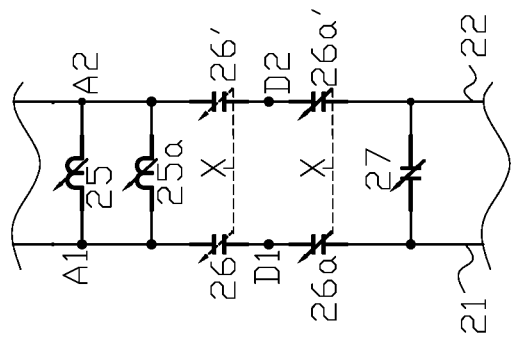
FIG. 17(c) is a detail of the impedance adjusting and frequency control network in FIG. 6 or FIG. 7 showing where the pair of variable capacitors in FIG. 17(a) and FIG. 17(b) are used for capacitor pair 26-26' in FIG. 6 or FIG. 7.
Figure 17A:
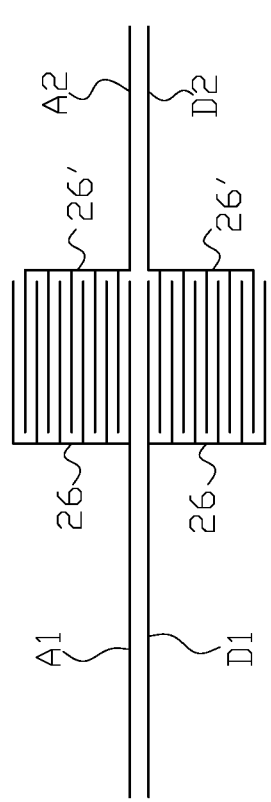
FIG. 17(a) and FIG. 17(b) are diagrammatic top and front views, respectively, of one example of a high frequency variable capacitor pair that is used in some examples of the high frequency power supply system of the present invention.
Figure 17B:
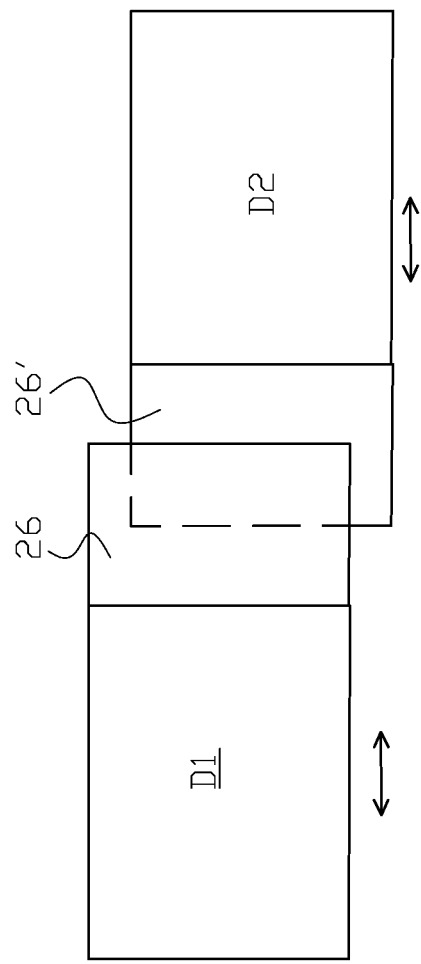

In some embodiments of the present invention one or both of the variable capacitor pairs 27a-27a' and 26a and 26a' in FIG. 6 or FIG. 7 of the impedance adjusting and frequency control network 23 can be formed as shown in FIG. 17(a) and FIG. 17(b) where variable capacitor pair 26-26' in FIG. 6 or FIG. 7 is formed from moveable bus sections A1, A2, D1 and D2 connected respectively to interleaved and spaced apart electrically conductive plates 26 and 26' as shown in detail FIG. 17(c) from the impedance adjusting and frequency control network in FIG. 6 or FIG. 7.

In some embodiments of the present invention a combination of one or more of the adjustable geometrically-shaped reactor pairs and capacitor pairs are used in an output impedance adjusting and frequency control network of the present invention.

FIG. 18(a) illustrates one example of a graphical user interface allowing user visualization of a target as a means to indicate the actual running point given the load characteristics and capacitance and inductance settings in the inverter output impedance adjusting and frequency control network 23 that is controlling power magnitude and frequency to the load. The center of the coordinate system can be used as an indication to a user of a high frequency power supply system of the present invention for precisely setting the system operating frequency and Q based independent of the load impedance at any time during a welding or heat treatment process.

Figure 18B:
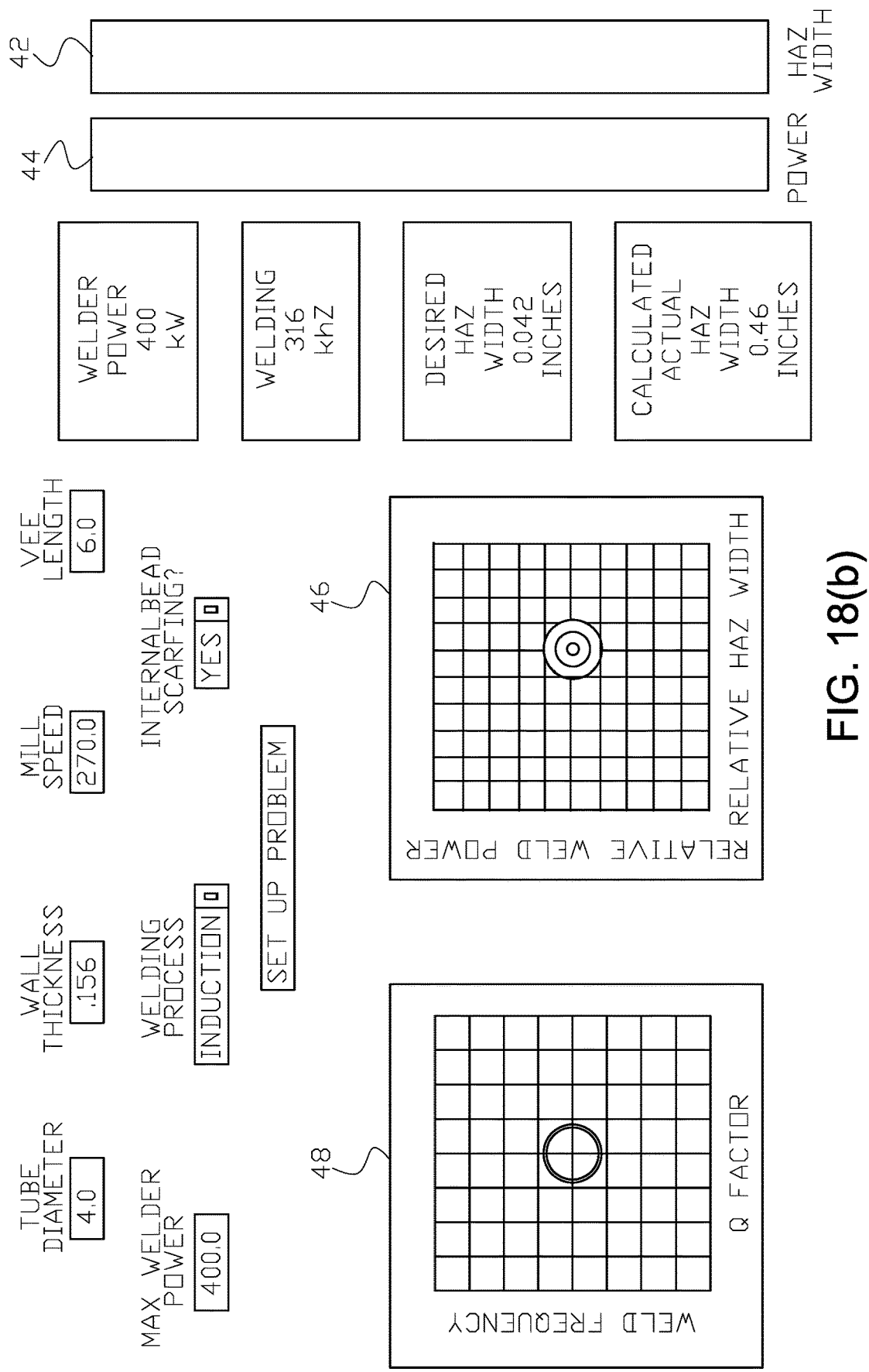
FIG. 18(b) is one example of a display of controls for a recipe creation and storage, welding process factors, conditions of welding process factors for a weld and quantities representative of heat affect zone (HAZ) characteristics of a weld, as generated by a high frequency heating power supply system of the present invention.
Figure 19D:
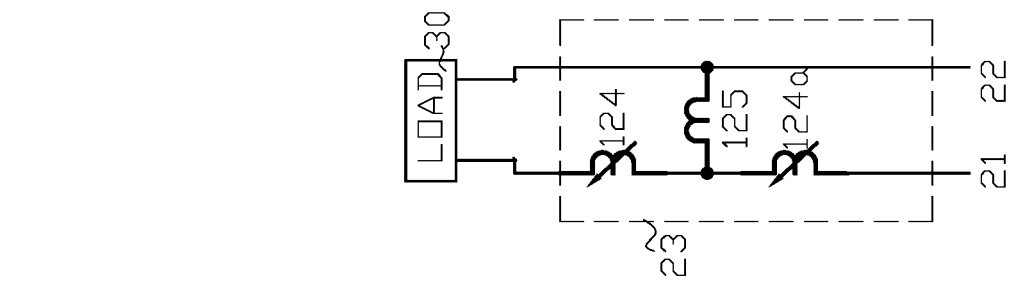
FIG. 19(a) through FIG. 19(d) illustrate selective non-limiting alternative embodiments of an inverter output impedance adjusting and frequency control network used in some embodiments of the invention.
Figure 19C:
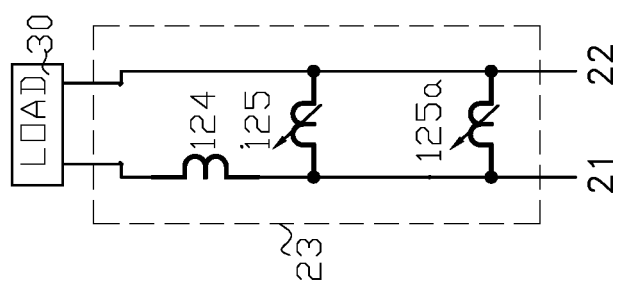
Figure 19B:
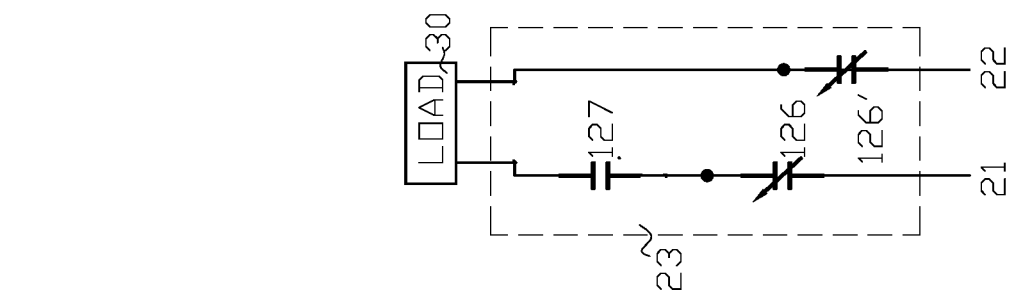
Figure 19A:
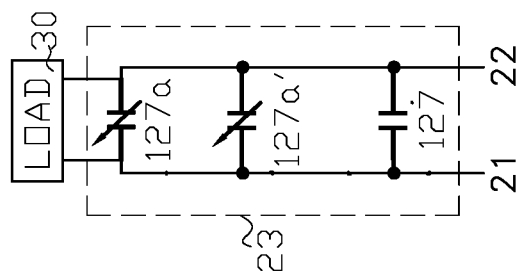

FIG. 18(b) illustrates one example of a system microcontroller displaying virtual control bars 42 and 44 on a graphical user interface shown in the figure for controlling the welding frequency and the welding power, respectively, of a forge welding or heating apparatus with which a high frequency power supply system of the present invention can be used. When the user of the apparatus modifies the position of either of the control bars 42 (HAZ width) or 44 (Power), such that the welding frequency or the welding power of the apparatus is modified, the microcontroller displays, in real or substantially real time, a quantity related to the predicted value of the HAZ width. In some embodiments of the present invention the microcontroller also displays the optimal welding frequency on the graphical user interface, and also shows the percentage difference between the predicted and optimal HAZ widths on a two dimensional graph 46, such as shown in FIG. 18(b). The display in FIG. 18(b) incorporates the graphical user interface of FIG. 18(a) giving the user of the forge welding or heating apparatus additional control over the welding or heating process for precisely setting the system operating frequency and Q factor based independent of the load impedance at any time during a welding or heat treatment process.

Alternatively the human machine interface control panel in some embodiments of the invention may have an integrated single user input control device, such as a single synergistic knob, to control power magnitude output and frequency output from the high frequency power supply system in combination with a power and frequency display and the heat affected zone size.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A method of controlling a highly regulated power and frequency from a high frequency power supply system to a workpiece load in a welding process or an annealing process from a full bridge inverter or a half-bridge inverter having a plurality of switching devices via an inverter output impedance adjusting and frequency control network independent of a workpiece impedance of the workpiece load, the method comprising:
   providing at least one geometrically-shaped pair of variable reactors and at least one pair of variable capacitors in the inverter output impedance adjusting and frequency control network;
   controlling a switching of the plurality of switching devices; and
   controlling a variable impedance from the inverter output impedance adjusting and frequency control network to the workpiece load.

2. The method of claim 1 wherein controlling the switching of the plurality of switching devices comprises a hard switching control of the plurality of switching devices and therein controlling the variable impedance from the inverter output impedance adjusting and frequency control network to the workpiece load comprises an adjusting of an impedance of the at least one geometrically-shaped pair of variable reactors and the at least one pair of variable capacitors independent of the workpiece impedance of the workpiece load.

3. The method of claim 1 wherein controlling the switching of the plurality of switching devices comprises a pulse width modulated variable switching control of the plurality of switching devices and wherein controlling the variable impedance from the inverter output impedance adjusting and frequency control network to the workpiece load comprises an adjusting of an impedance of the at least one geometrically-shaped pair of variable reactors and the at least one pair of variable capacitors independent of the workpiece impedance of the workpiece load.

4. A method of controlling a highly regulated power and frequency from a high frequency power supply system to a workpiece load in a welding process or an annealing process from a single phase inverter output leads from a full bridge inverter or a half-bridge inverter having a plurality of switching devices via an inverter output impedance adjusting and frequency control network independent of a workpiece impedance of the workpiece load, the method comprising:
   providing at least one geometrically-shaped pair of variable reactors and at least one pair of variable capacitors in the inverter output impedance adjusting and frequency control network;
   controlling a switching of the plurality of switching devices; and
   controlling a variable impedance from the inverter output impedance adjusting and frequency control network to the workpiece load where the inverter output impedance adjusting and frequency control network comprises:
      a series combination of paired series reactors and capacitors comprising a first pair of series variable reactors, a second pair of series variable reactors, a first pair of series variable capacitors, and a second pair of series variable capacitors arranged and connected in series to the single phase inverter output leads;
      a parallel combination of paired parallel reactors and capacitors comprising a pair of parallel variable reactors, a pair of parallel variable capacitors arranged and connected in parallel between the single phase inverter output leads; and
      a parallel variable reactor arranged and connected in parallel between the single phase inverter output leads.

5. The method of claim 4 wherein controlling the switching of the plurality of switching devices comprises a hard switching control of the plurality of switching devices and wherein controlling the variable impedance from the inverter output impedance adjusting and frequency control network to the workpiece load comprises an adjusting of an impedance of the series combination of paired series reactors and capacitors and the parallel combination of paired parallel reactors and capacitors independent of the workpiece impedance of the workpiece load.

6. The method of claim 4 wherein controlling the switching of the plurality of switching devices comprises a pulse width modulated variable switching control of the plurality of switching devices and wherein controlling the variable impedance from the inverter output impedance adjusting and frequency control network to the workpiece load comprises an adjusting of an impedance of the series combination of paired series reactors and capacitors and the parallel combination of paired parallel reactors and capacitors independent of the workpiece impedance of the workpiece load.

7. A method of controlling a highly regulated power and frequency from a high frequency power supply system to a workpiece load in a welding process or an annealing process from a full bridge inverter or a half-bridge inverter having a plurality of switching devices via an inverter output impedance adjusting and frequency control network independent of a workpiece impedance of the workpiece load, the inverter output impedance adjusting and frequency control network comprising at least one pair of variable reactors having a reactor pair moveable insert core within a reactor pair split bus section of the at least one pair of variable reactors, the method comprising:
   controlling a switching of the plurality of switching devices; and
   controlling an adjustable power transfer and a variable output frequency from the inverter output impedance adjusting and frequency control network to the workpiece load by moving the reactor pair moveable insert core within the reactor pair split bus section of the at least one pair of variable reactors.

8. The method of claim 7 further comprising allowing a resonant point of the high frequency power supply system to change with the workpiece impedance and alternatively adjusting control of the switching of the plurality of switching devices to maintain a maximum power transfer or maintaining control of the plurality of switching devices for a less than maximum power transfer as the resonant point changes.

9. The method of claim 7 wherein controlling the switching of the plurality of switching devices comprises a hard switching control of the plurality of switching devices and controlling a variable impedance from the inverter output impedance adjusting and frequency control network to the workpiece load independent of the workpiece impedance of the workpiece load.

10. The method of claim 7 wherein controlling the switching of the plurality of switching devices comprises a pulse width modulated variable switching control of the plurality of switching devices and controlling a variable impedance from the inverter output impedance adjusting and frequency control network to the workpiece load independent of the workpiece impedance of the workpiece load.

\* \* \* \* \*